United States Patent [19]

Kaneko

[11] Patent Number: 5,485,283
[45] Date of Patent: Jan. 16, 1996

[54] IMAGE TRANSMITTING APPARATUS FOR TRANSMITTING COLOR IMAGE DATA IN A COLOR TRANSMITTING MODE OR A MONOCHROMATIC TRANSMITTING MODE

[75] Inventor: Yoji Kaneko, Yokohama, Japan

[73] Assignee: Canon Kabushiki Kaisha, Tokyo, Japan

[21] Appl. No.: 255,814

[22] Filed: Jun. 7, 1994

Related U.S. Application Data

[63] Continuation of Ser. No. 758,799, Sep. 12, 1991, abandoned.

[30] Foreign Application Priority Data

Sep. 14, 1990 [JP] Japan ................. 2-245029

[51] Int. Cl.$^6$ ................. H04N 1/56; H04N 1/64
[52] U.S. Cl. .............. 358/518; 358/524; 358/527; 358/530
[58] Field of Search ................. 358/508, 515, 358/524, 527, 530, 529, 462, 539, 518, 520, 521; 345/150, 186, 189, 147; 395/164, 131

[56] References Cited

U.S. PATENT DOCUMENTS

| | | | |
|---|---|---|---|
| 4,672,459 | 6/1987 | Kudo | 358/462 |
| 4,739,397 | 4/1988 | Hayashi | 358/80 |
| 4,926,253 | 5/1990 | Nakashima et al. | 358/80 |
| 4,992,887 | 2/1991 | Aragaki | 358/403 |
| 5,321,517 | 6/1994 | Takei et al. | 345/150 |

FOREIGN PATENT DOCUMENTS

| | | |
|---|---|---|
| 383331 | 8/1990 | European Pat. Off. . |
| 395405 | 10/1990 | European Pat. Off. . |

*Primary Examiner*—Scott A. Rogers
*Attorney, Agent, or Firm*—Fitzpatrick, Cella, Harper & Scinto

[57] ABSTRACT

In a color facsimile apparatus, a color scanner converts an original image into color image data, and a transmitter transmits the color image data in either a color transmission mode or a monochromatic transmission mode. A processor processes the color image data as processed color image data or processed monochrome image data according to the transmission mode of the transmitter. The data is displayed on a monitor, prior to transmission, in a first mode as a monochrome image and in a second mode as a color image.

22 Claims, 21 Drawing Sheets

HORIZONTAL 1120 →

VERTICAL 800 ↓

DISPLAY

UNIT:PIXEL NUMBER

3308 → 4676 →

4677 ↓

6614 ↓

A4

A3

UNIT:PIXEL NUMBER(400×400dpi)

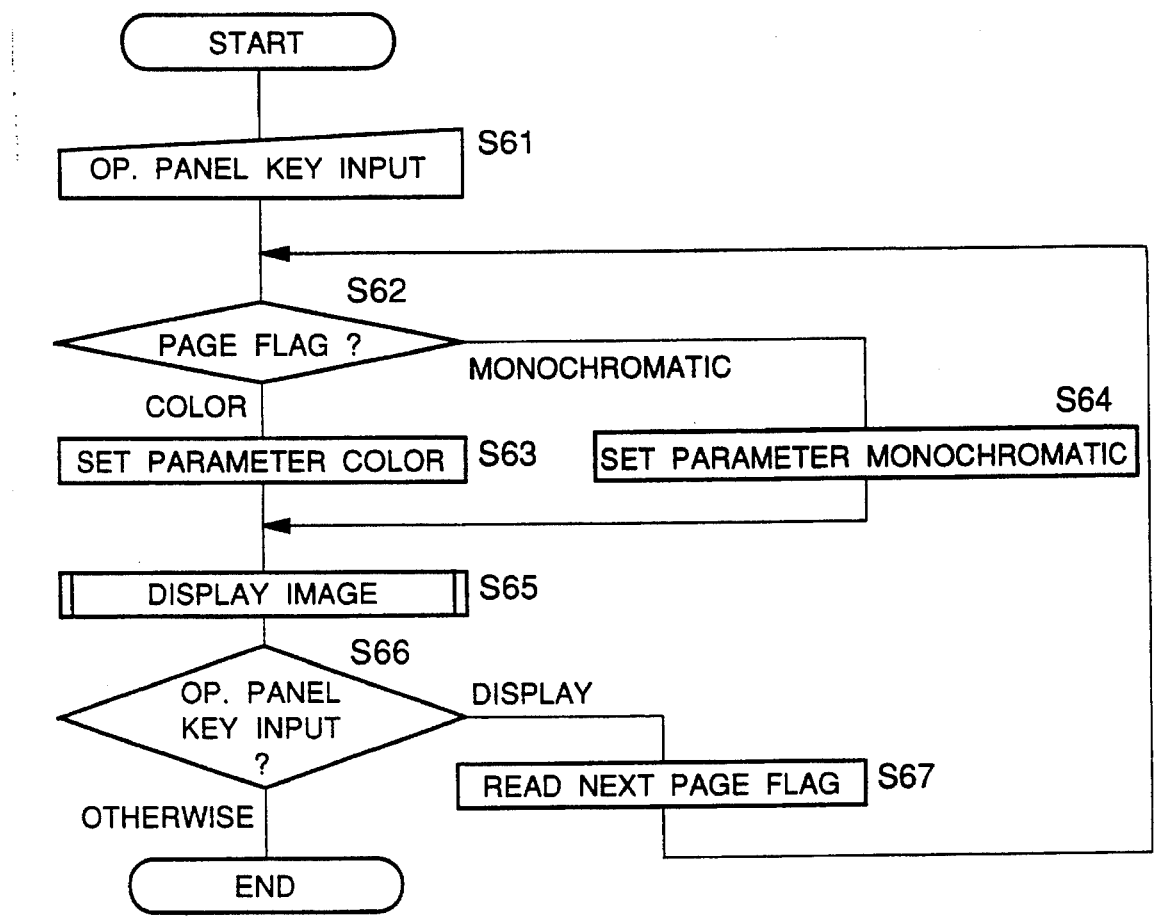

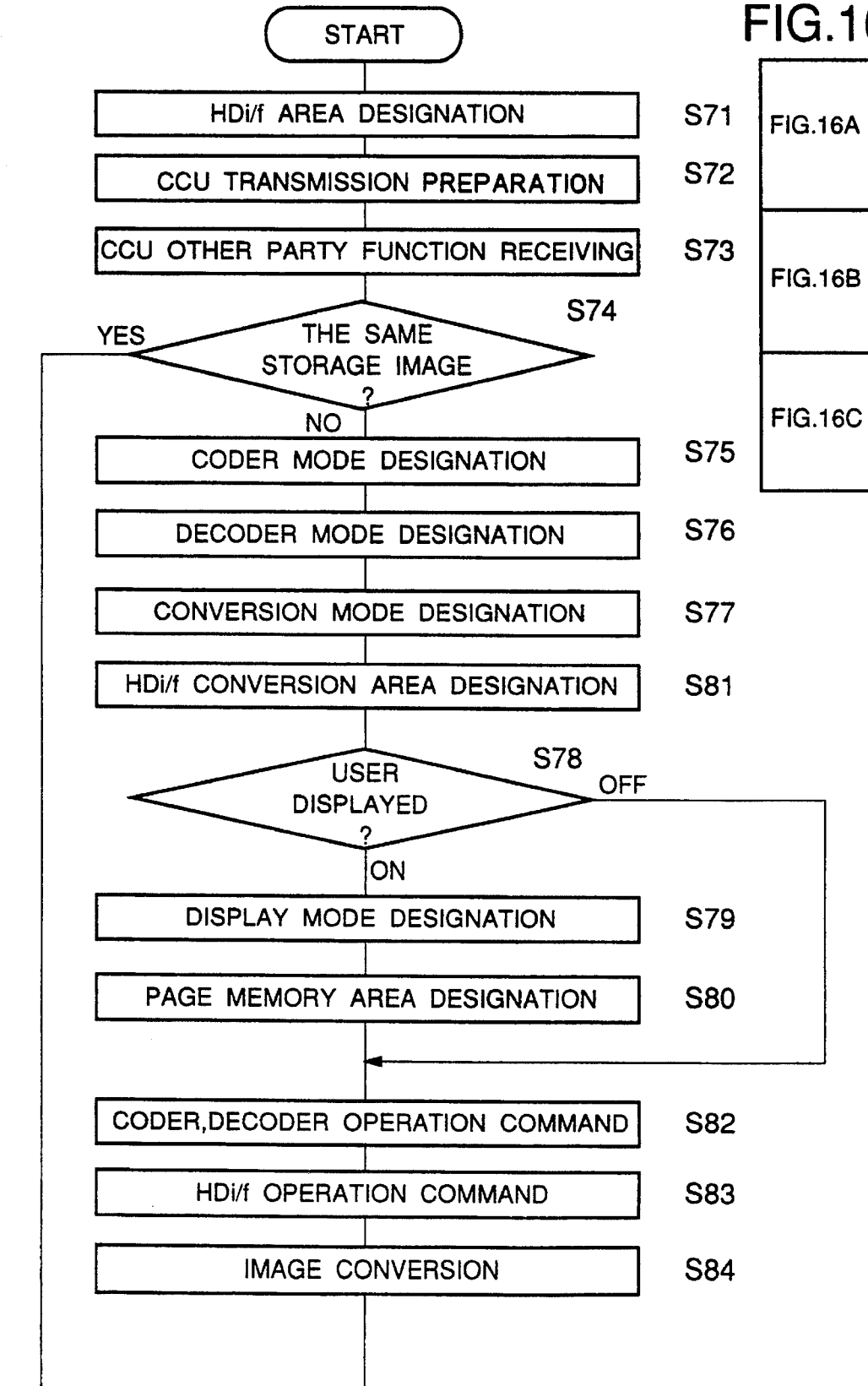

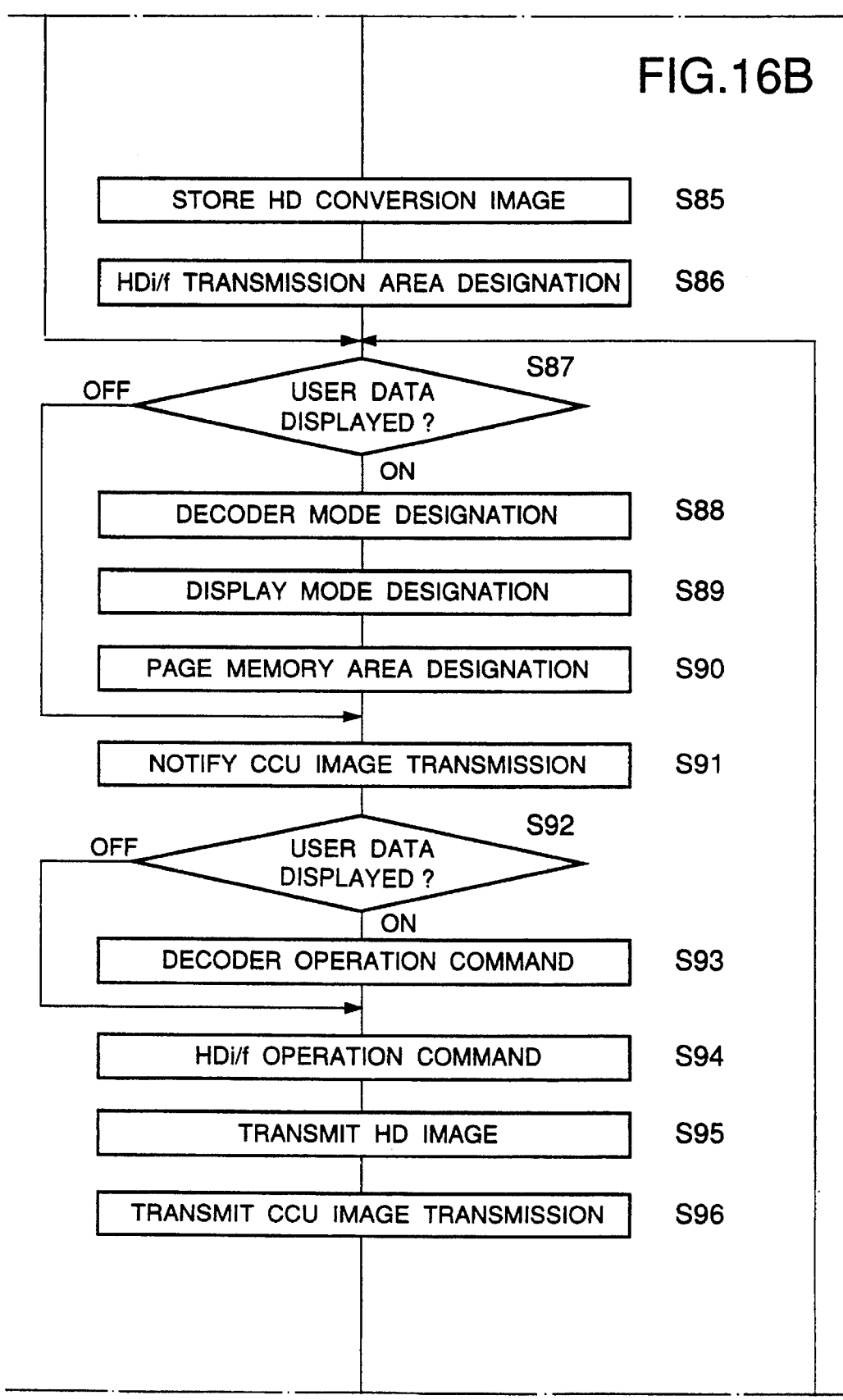

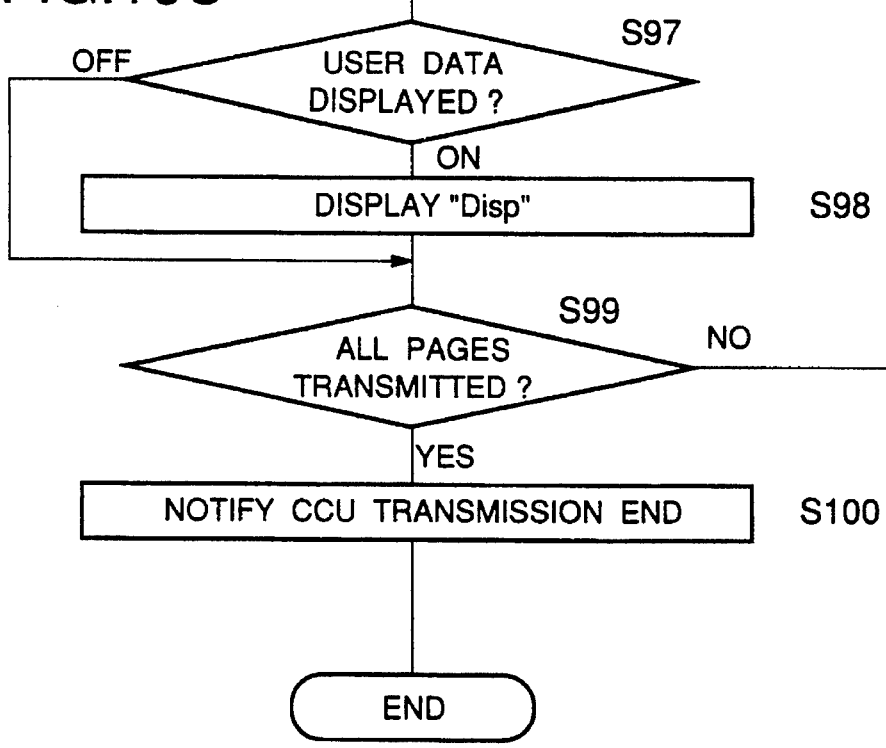

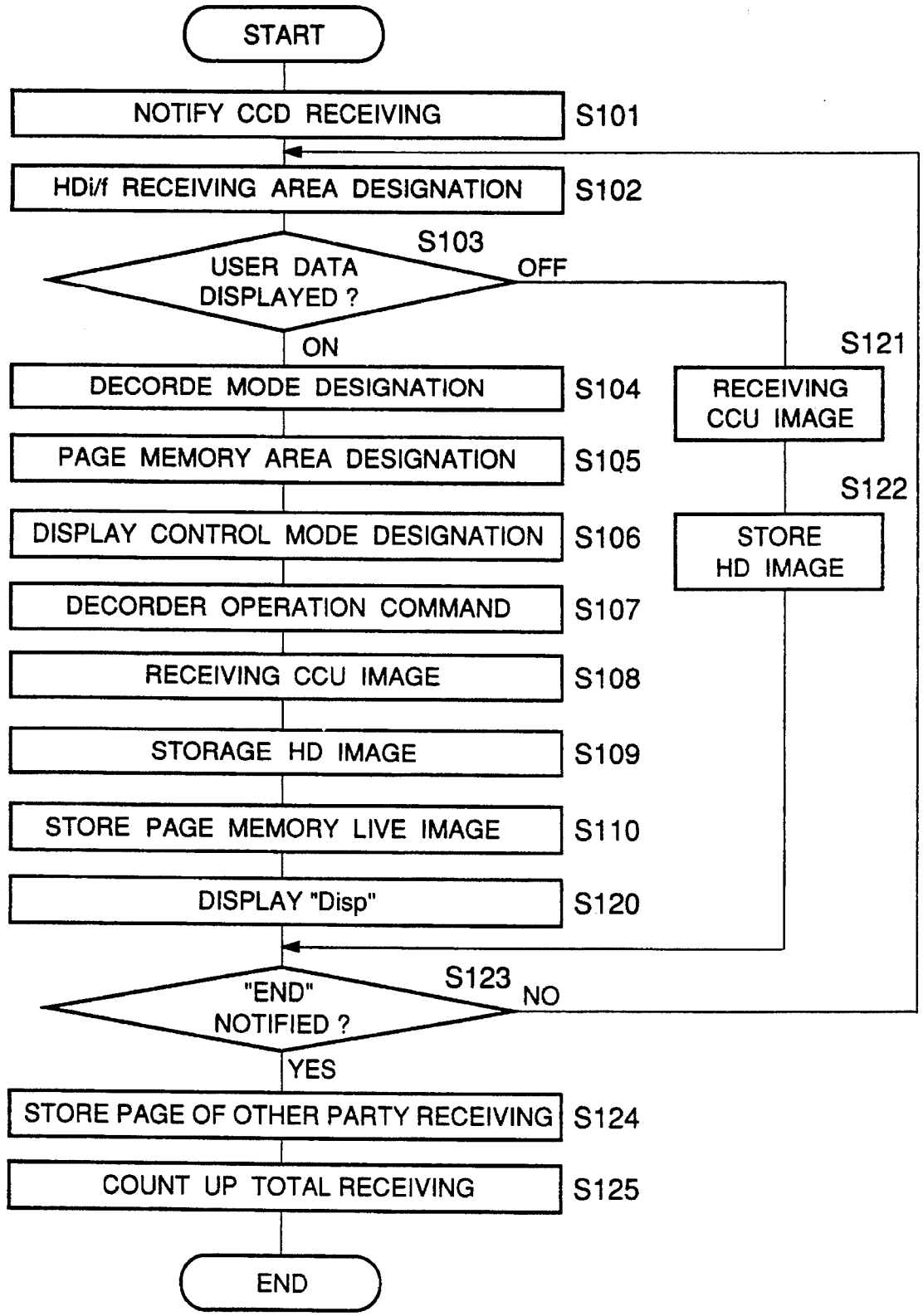

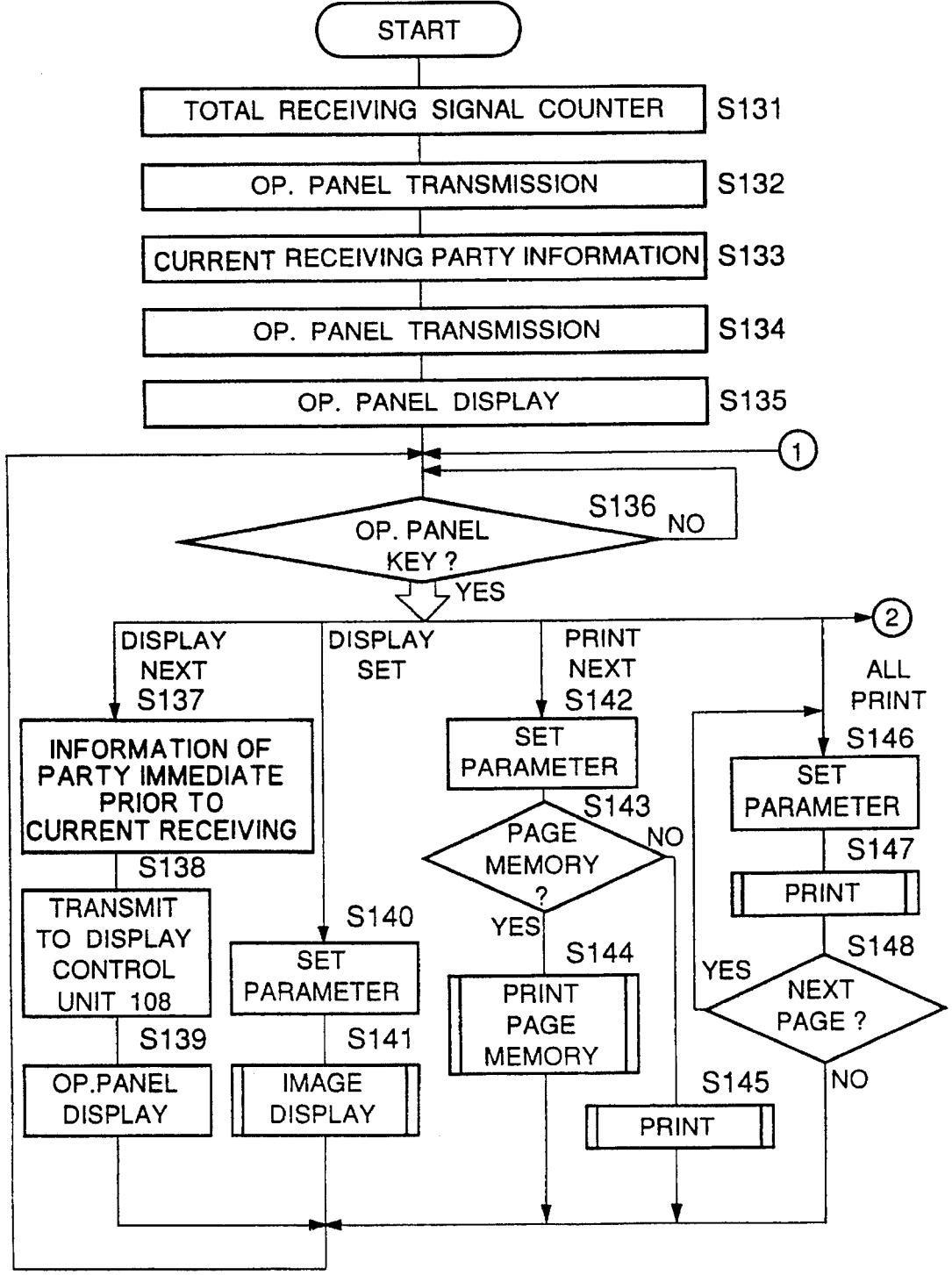

5,485,283

IMAGE TRANSMITTING APPARATUS FOR TRANSMITTING COLOR IMAGE DATA IN A COLOR TRANSMITTING MODE OR A MONOCHROMATIC TRANSMITTING MODE

This application is a continuation of application Ser. No. 07/758,799 filed Sep. 12, 1991, now abandoned.

BACKGROUND OF THE INVENTION

1. Field of the Invention

The present invention relates to a facsimile apparatus capable of transmitting color images and monochromatic images.

2. Related Background Art

Conventional color facsimile apparatus is so designed that the transmitted or received original image is obtained as a color hard copy on paper by a printer such as a thermal printer, an ink jet printer or an electrostatic printer.

In such conventional color facsimile apparatus, therefore, the original image is only obtained as a hard copy from such printer, so that, in order to confirm the original image read at transmission, the image output on the printer has to be printed and the paper is therefore wasted.

Also at the image reception, the images are all printed by the printer, including unnecessary ones, so that the paper again may be wasted.

SUMMARY OF THE INVENTION

An object of the present invention is to provide a facsimile apparatus not associated with such drawbacks.

Another object of the present invention is to provide a facsimile apparatus which can confirm the image in advance prior to transmission or printing.

Still another object of the present invention is to provide a color facsimile apparatus capable of providing monochromatic display according to the transmission mode, even on image data obtained by color reading.

The foregoing objects can be attained, according to a preferred embodiment of the present invention, by a color facsimile apparatus capable of transmitting color and black-and-white images and equipped with a monitor for image display, wherein, in case of transmission of a black-and-white image, predetermined components are extracted as black-and-white data from the color image signals obtained by image reading in a scanner and are displayed on the monitor, so that a black-and-white image reading need not be conducted and the configuration of the apparatus can therefore be simplified.

Still another object of the present invention is to provide a color facsimile apparatus capable of improving the quality of an image displayed on the monitor.

Still another object of the present invention is to provide a color facsimile apparatus with improved convenience of use.

Still another object of the present invention is to provide a color facsimile apparatus with novel functions.

Still another object of the present invention is to provide a color facsimile apparatus capable of achieving various functions with a simple structure.

Still other objects of the present invention, and the advantages thereof, will become fully apparent from the following description of the embodiments, taken in conjunction with the attached drawings.

BRIEF DESCRIPTION OF THE DRAWINGS

FIG. 15 is a flow chart showing an operation of displaying an image stored in a rigid disk and transmitting the image;

FIG. 16 is a flow chart showing a transmitting operation and a display operation;

FIG. 17 is a flow chart showing a receiving operation and a display operation of the received image;

FIGS. 18A and 18B are flow charts showing an operation with the operation panel after reception;

DETAILED DESCRIPTION OF THE PREFERRED EMBODIMENTS

Figure 1:
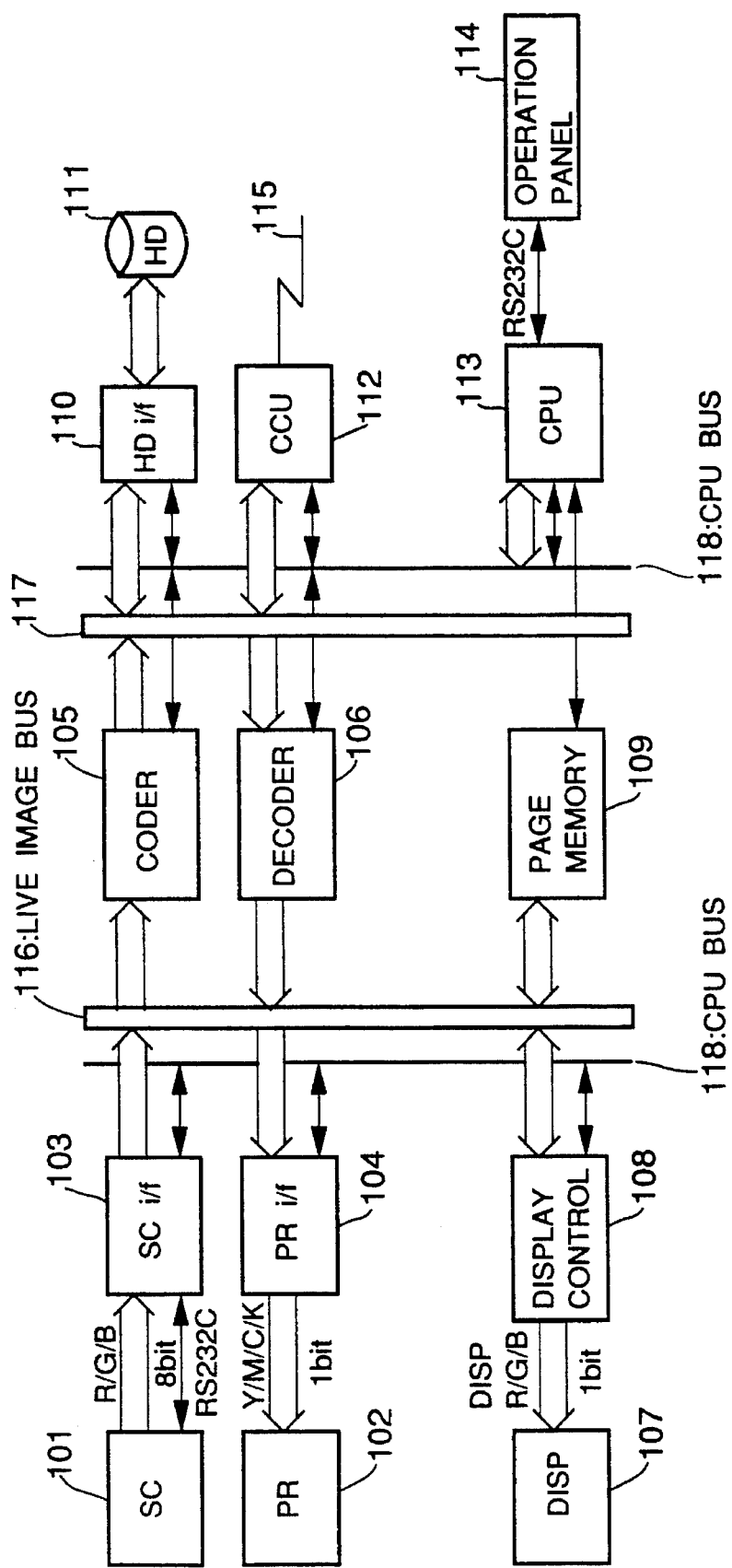
FIG. 1 is a block diagram of an embodiment of the color facsimile apparatus of the present invention.

FIG. 1 is a block diagram of a color facsimile apparatus constituting an embodiment of the present invention.

The facsimile apparatus is so constructed as to be capable of transmitting both color and black-and-white images, and particularly of color image transmission with a reduced data amount, by generating a color image of binary continuous tone from a color image of multi-value continuous tone obtained by reading an original image.

The above-mentioned image, converted from a multi-value state to a binary state (called uncompressed image data in the present embodiment), is further encoded to obtain the actually transmitted data. The facsimile apparatus of the present embodiment displays the image in the state of binary uncompressed image data on the display unit, thereby enabling visual observation of the transmitted or received image without hard copying.

In the following the components of the apparatus are described.

A scanner 101 reads a color image, and provides an 8-bit multi-value image signal for each of red (R), green (G) and blue (B).

A printer 102, capable of printing a color image, may be an ink jet printer such as so-called bubble jet printer in which ink droplets are discharged by film boiling, a thermal printer or an electrostatic printer, and receives a 1-bit signal for each of yellow (Y), magenta (M), cyan (C) and black (Bk). In the present invention, however, a printer may be employed which receives multi-value signals.

A scanner interface 103 effects binary digitization of the image signal from the scanner 101, and transmits control signals from a CPU 113 to the scanner 101. The details of this unit will be explained later.

A printer interface 104 converts RGB image signals from a decoder 106 into YMCK signals for application to the printer 102, and also transmits the control signals from the CPU 113 to the printer 102.

An encoder 105 effects color compression or MMR compression, as will be explained later, on the R, G and B 1-bit image signals from the interface 103, and stores the obtained encoded image data in a rigid disk 111 in the unit of a page.

A decoder 106 effects color decoding or MMR decoding of the encoded image data from the rigid disk 111, thereby releasing R, G and B uncompressed 1-bit image data.

A display unit 107 is provided on an operation panel 114 and displays data from a display control unit 108. In the present embodiment, the display unit 107 is composed a unit capable of plain dot display such as a cathode ray tube, a liquid crystal display panel or a plasma display panel, and is rendered capable of displaying a color image.

The display control unit 108 effects a reduction process, to be explained later, on the uncompressed image data from the decoder 106, and stores the obtained results in an internal memory, thereby generating R, G and B 1-bit signals.

A rigid disk interface 110 sends or receives encoded image data to or from an encoded image bus 117 for interfacing with the rigid disk 111, and controls the operation area and the operation mode of the rigid disk 111 according to commands from the CPU 113.

The rigid disk 111, is composed of a magnetic disk or a magneto-optical disk, which stores encoded image data in the unit of a page at transmission or reception.

A communication control unit (CCU) 112 controls communication with a communication channel 115, thereby transmitting or receiving encoded image data. It also exchanges facsimile protocol data with the CPU 113 through a CPU bus 118, and effects transfer of encoded image data to or from the rigid disk 111 through an encoded image bus 117.

The communication channel 115 may be composed, for example, of ISDN, PSDN or PSTN.

The CPU 113 is provided with a ROM storing programs and a RAM for storing various data, and serves to control the entire apparatus. It also controls a CPU bus 118, and is connected with an operation panel 114 by an RS 232C interface.

A page memory 109 is used for storing R, G and B uncompressed 1-bit image data in the form of a bit map memory, and has a memory capacity of 2 MB× 3=6 MB for A4-sized image. In the present embodiment it is composed of a DRAM, refresh controlled by the CPU 113.

The operation panel 114 is provided with a keyboard, a display unit etc. and is connected with and controlled by the CPU 113 through RS232C serial signals.

An uncompressed image bus 116 transfers the R, G and B uncompressed binary image data among various blocks.

The encoded image bus 117 transfers encoded image signals among various blocks.

The CPU bus 118 transfers the control signals among the CPU 113 and various blocks.

Figure 2:
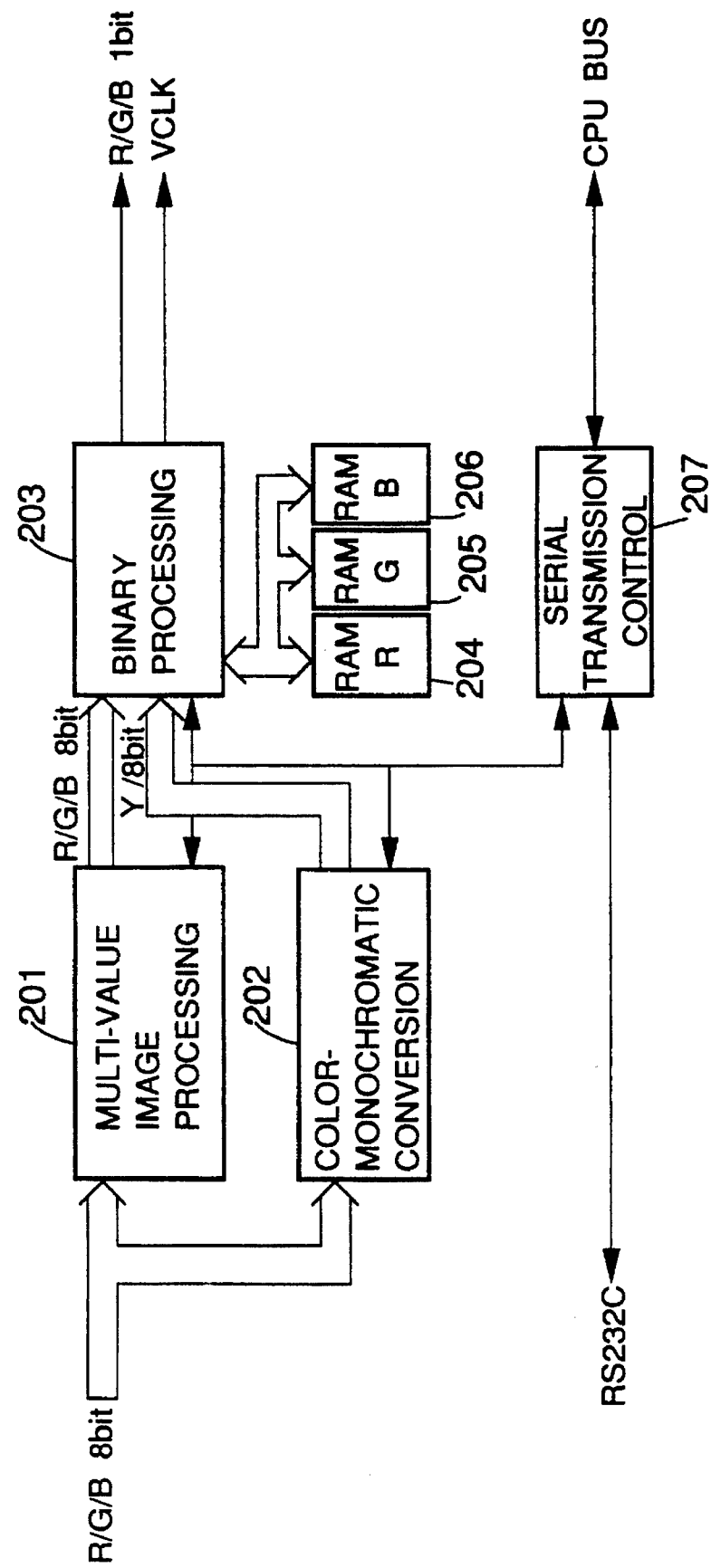
FIG. 2 is a detailed block diagram of the scanner interface shown in FIG. 1.

FIG. 2 is a detailed block diagram of the scanner interface 103 mentioned above.

A multi-value image processing unit 201 receives R, G and B image signals of 8 bits each, and effects correction and image processing on the R, G, B signals.

A color-monochromatic conversion unit 202 generates, from the R, G, B signals, an 8-bit luminance signal $Y=R(0.3)+G(0.59)+B(0.11)$ as black-and-white data. However the black-and-white data are not limited to such a method and may be formed, for example, by fetching the G component only.

A binary digitizing unit 203 receives the R, G and B 8-bit signals or the 8-bit luminance signal Y, and generate R, G and B 1-bit signals by an error diffusion method or a simple binary digitizing method. Also the 8-bit Y signal is released as a 1-bit B signal serving as a common signal.

RAM's 204, 205 and 206 are used as line buffers for an error diffusion method in the binary digitizing unit 203.

A serial communication control unit 207 interfaces the control signals for the scanner 101 according to a RS232C format in the present embodiment, and effects data transfer with the CPU 113.

Though not illustrated, the printer interface 104 is also provided with a similar serial communication control unit for interfacing with the printer 102.

The serial communication control unit 207 also effects control of an internal hardware and mode setting.

Figure 3:
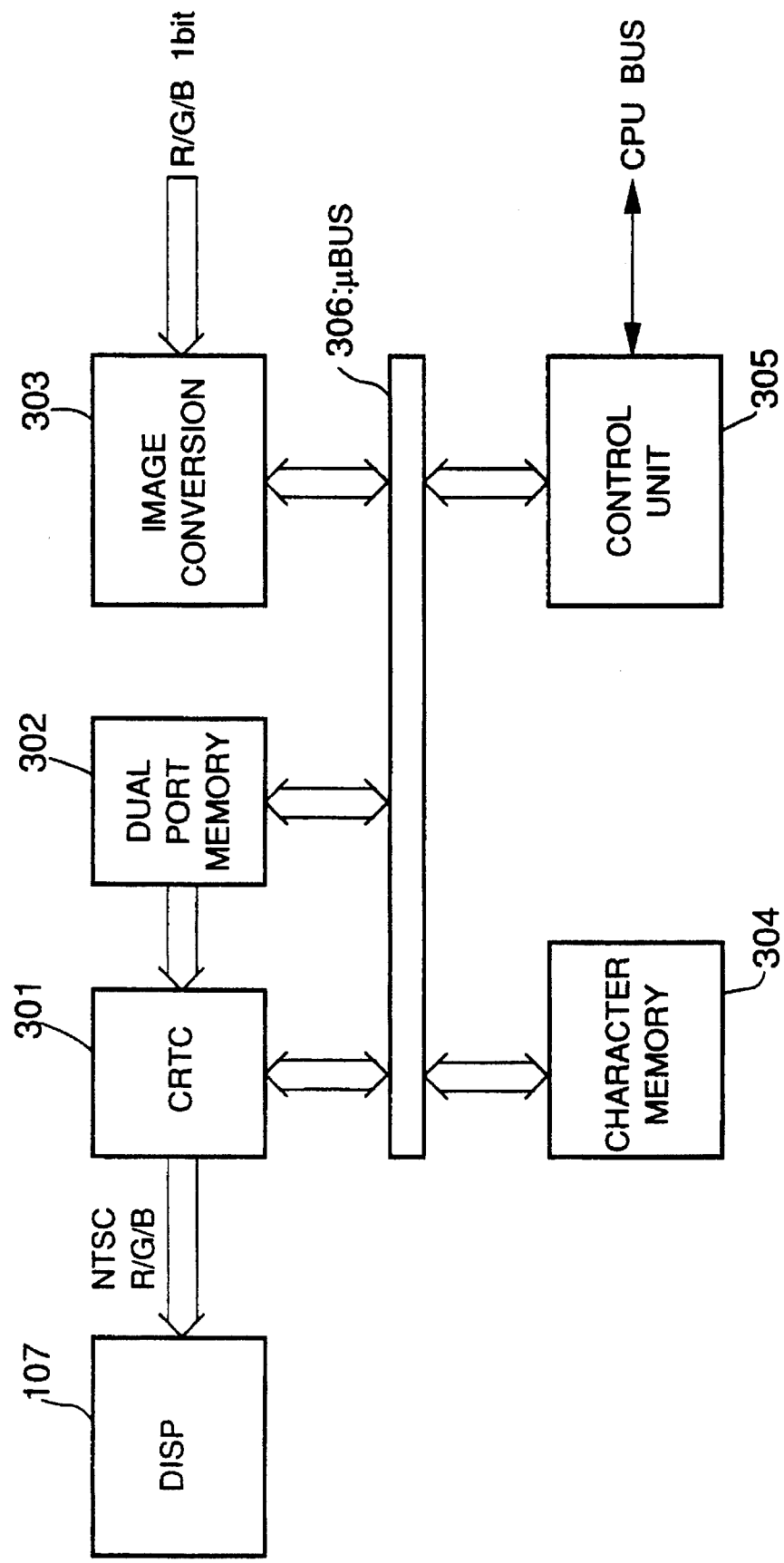
FIG. 3 is a detailed block diagram of the display control unit shown in FIG. 1.

FIG. 3 is a detailed block diagram of the display control unit 108.

A CRT controller 301 supplies the display unit 107 with a display signal of NTSC standard. The display unit 107 may also be composed of a liquid crystal display unit or a plasma display panel, instead of a cathode ray tube (CRT).

A dual port memory 302 is a bit map memory corresponding in storage size to the display size of display unit 107, and, in case the display unit 107 is composed of 1120 (horizontal)× 800 (vertical) pixels, has a capacity of two frames of 900 Kbit×3 colors (R, G, B)=2.7 Mbit, including bit map memories for accumulating data of R, G and B frames.

An image conversion unit 303, provided for display, processes the R, G and B uncompressed image data to match the display size according to the display mode, and transfers the entered uncompressed R, G, B image data, as a part of the display data, to the dual port memory 302 through a μ-bus 306. In case of a monochromatic display mode, the image conversion unit 303 stores, among the entered R, G, B image data, the G component in the R, G, B bit map memories of the dual port memory 302, thereby effecting the monochromatic display. Also in case of the monochromatic mode, if the entered image data are monochromatic data, for example MMR encoded data, the data are stored in the R, G, B bit map memories of the dual port memory 302. The above-mentioned operations are automatically selected by a parameter set in the image conversion unit 303.

A character memory 304 temporarily stores character data for display, as controlled by a control unit 305, and transfers the data, as a part of display data, to the dual port memory 302 through the μ-bus 306.

A control unit 305 effects control of the CRT 301 and of the image conversion unit 303, transfer of display data among the dual port memory 302, image conversion unit 303 and character memory 304, and control of display data transfer between the CRT controller 301 and the dual port memory 302. It also controls various units according to commands from the CPU 113 and stores character data for display in the character memory 304.

Also the control unit 305 realizes an initial state without image display, by writing "0" in the R, G, B bit map memories of the dual port memory 302 and writing only the data from the character memory 304 into the dual port memory 302.

Furthermore, the control unit 305 controls the color selection of character display by writing the data from the character memory 304 into desired ones of the R, G, B bit map memories of the dual port memory 302. The control unit 305 is equipped with a memory storing character patterns corresponding to alphabets, numerals, kana characters, Chinese characters and other symbols.

Figure 6:
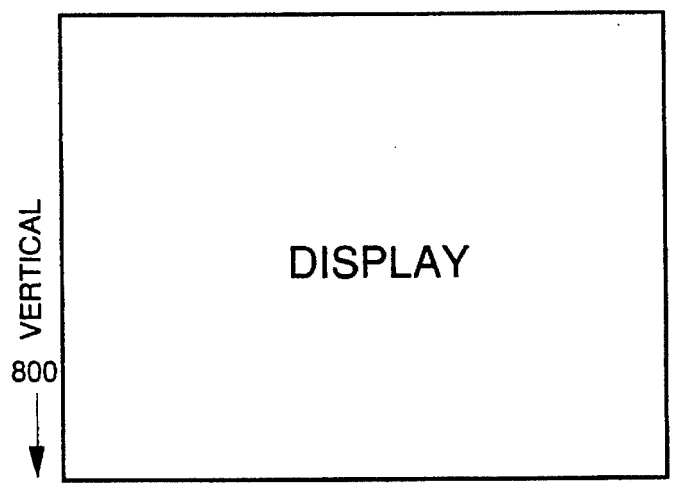
FIG. 6 is a diagram showing a displayed image on the display unit shown in FIG. 1.

FIG. 6 schematically illustrates a displayed image frame of the present embodiment.

Figure 7:
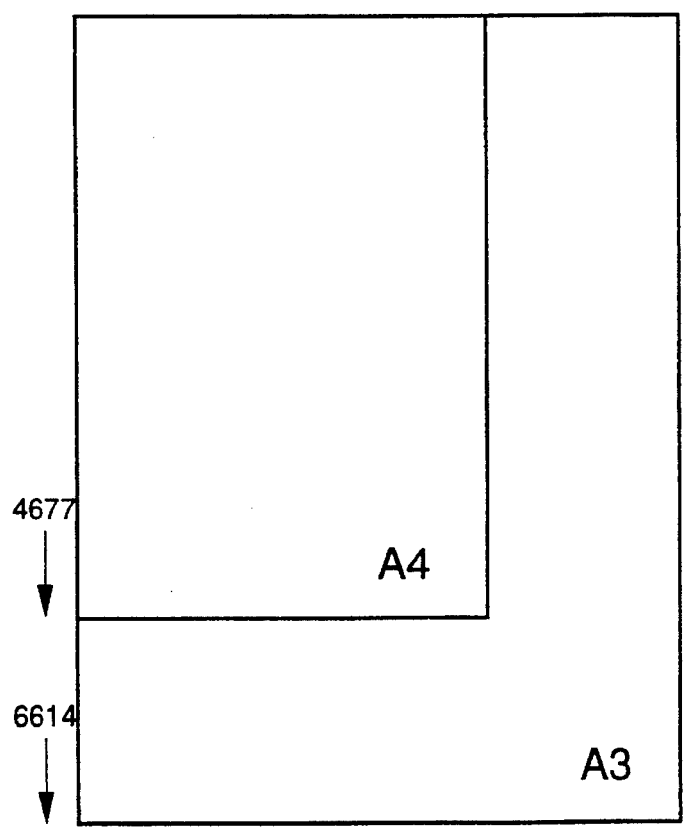
FIG. 7 is a diagram showing images of A4 and A3 sizes displayed on the display unit in said shown in FIG. 1.

In the present embodiment, an A4- or A3-sized image as shown in FIG. 7 can be displayed on the display unit 107 in a horizontal display state (horizontally oblong state) or in a vertical display state (vertically oblong state), with suitable image size reduction.

The image reduction rates are as follows.

| Horizontally oblong display state: | |
| --- | --- |
| A4 (400 × 400 dpi) | 24% |
| A4 (200 × 200 dpi) | 48% |
| A3 (400 × 400 dpi) | 17% |
| A3 (200 × 200 dpi) | 34% |
| Vertically oblong display state: | |
| A4 (400 × 400 dpi) | 34% |
| A4 (200 × 200 dpi) | 67% |
| A3 (400 × 400 dpi) | 24% |
| A3 (200 × 200 dpi) | 48%. |

Also in case of other sheets sizes such as B4 or B5, or in case the reduction rate varies according to the number of pixels, the control unit 305 effects image reduction by giving an instruction to the image conversion unit 303 according to the desired reduction rate.

Figure 10:
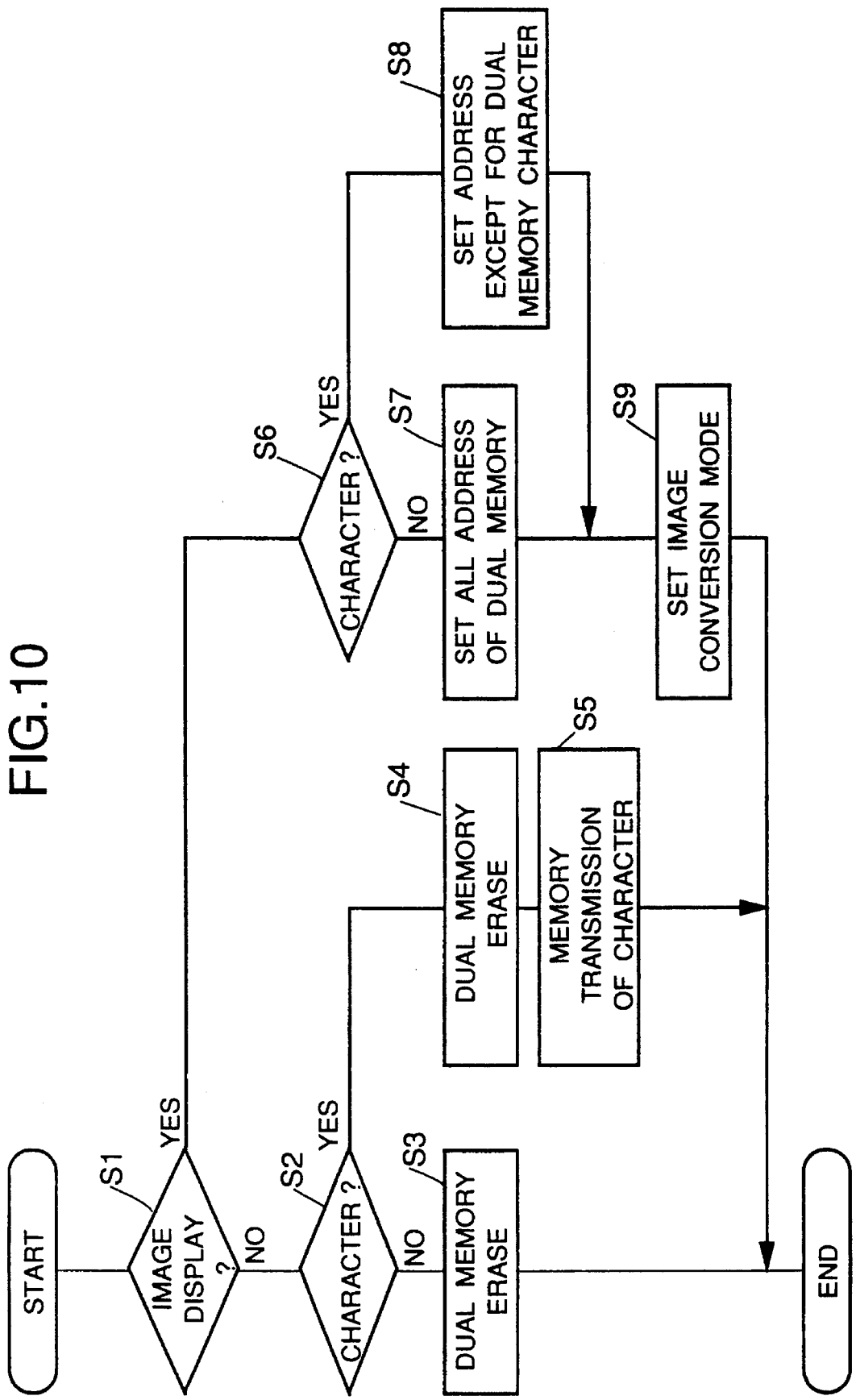
FIG. 10 is a flow chart showing the control sequence in display mode setting of the apparatus of FIG. 1.

FIG. 10 is a flow chart showing the operation in a display mode setting.

At first, according to a mode instruction from the CPU 113, the control unit 305 discriminates whether an image display is selected (S1), and, if not, it discriminates whether a character display is present (S2). If the character display is absent, the content of the dual port memory 302 is erased (S3). If it is present, the content of the dual port memory 302 is erased (S4) and the data of the character memory 304 are transferred to the dual port memory 302 (S5).

On other hand, if the step S1 identifies that the image display is selected, there is discriminated whether a character display is present (S6), and, if absent, an address counter of the control unit 305 is so set as to enter data of a frame into the dual port memory 302 (S7). In case the character display is present, the address counter is so set as to enter the image data into the dual port memory 302, excluding a portion for the character display (S8).

Then the mode is set in the image conversion unit 303 (S9) and the sequence is terminated.

Figure 11:
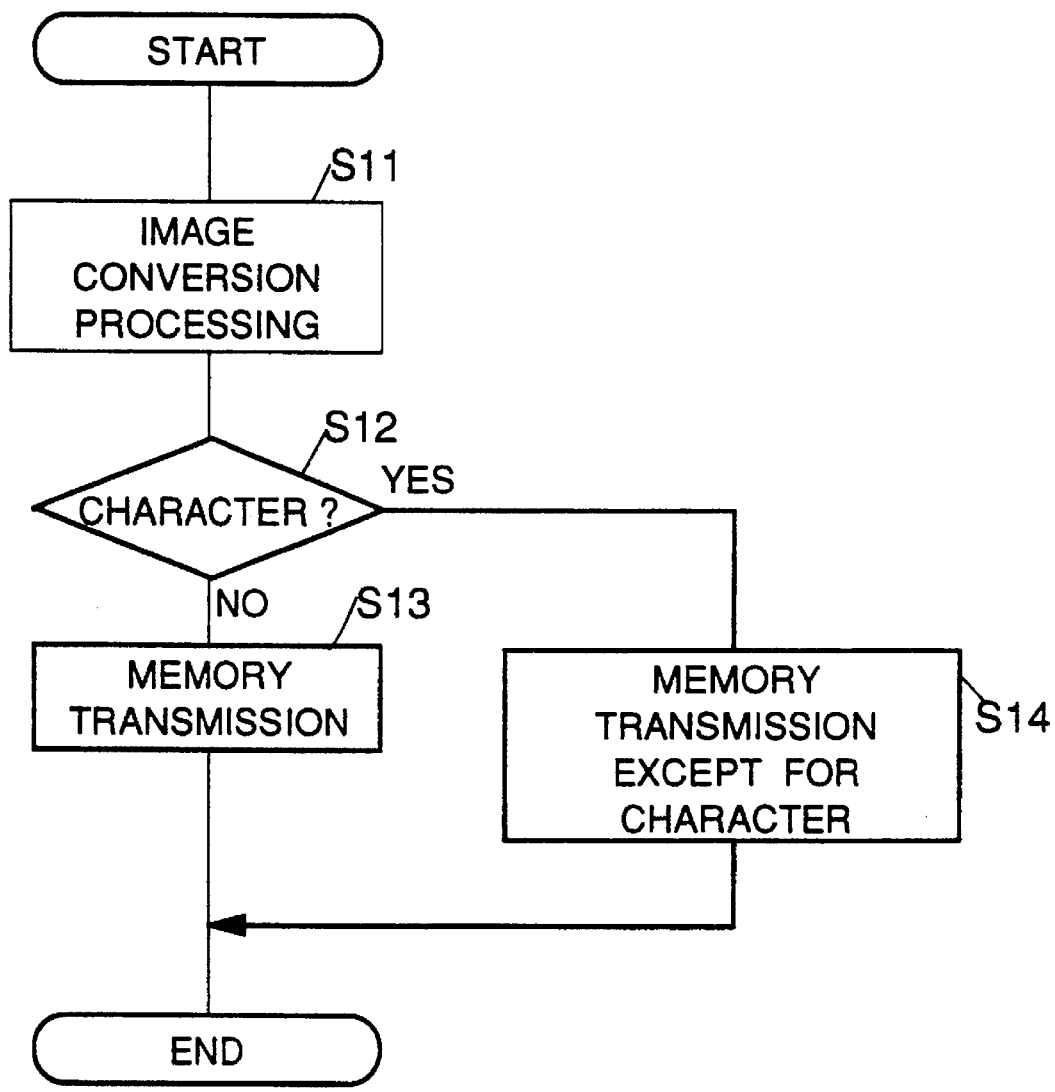
FIG. 11 is a flow chart of a display operation of the apparatus of FIG. 1.

FIG. 11 is a flow chart of display operation, for entering uncompressed image data from the uncompressed image bus 116 and displaying the data.

The image conversion unit 303 receives uncompressed image data and effects image conversion with a predetermined mode (S11), and, in the absence of character display (S12), the data of a frame are transferred to the dual port memory 302 (S13). In case the character display is present (S12), the data of a frame excluding the character display area are transferred to the dual port memory 302 (S14).

Figure 4:
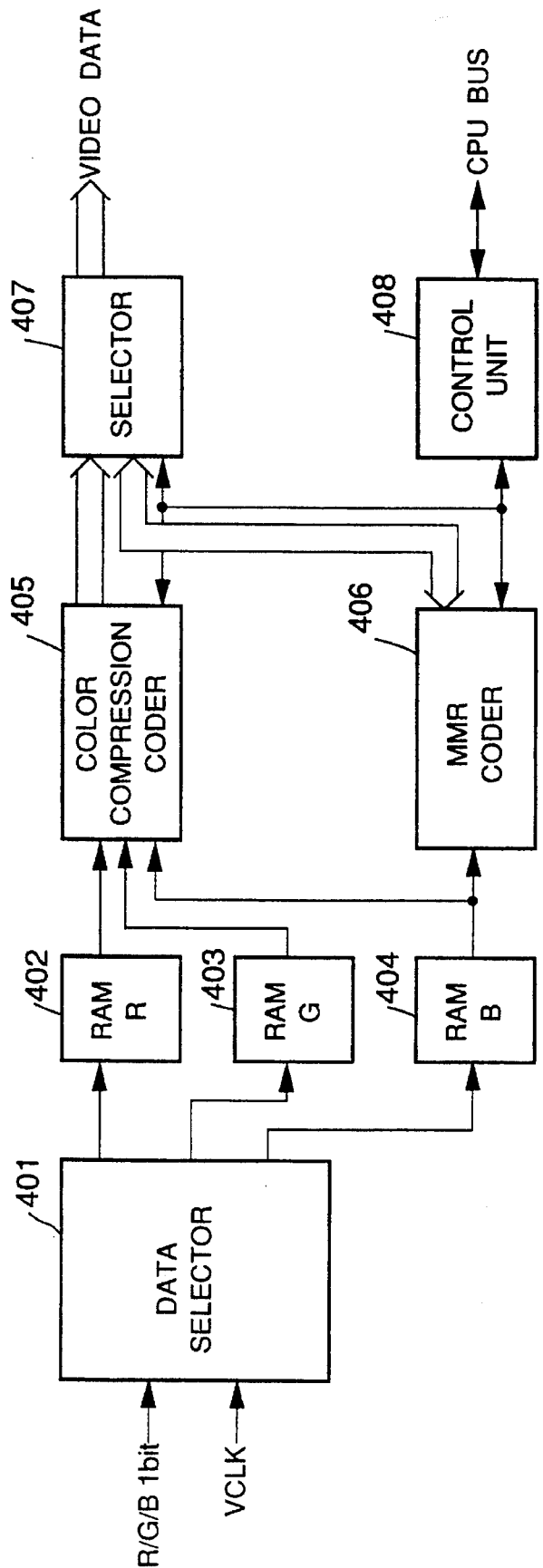
FIG. 4 is a detailed block diagram of the encoder unit shown in FIG. 1.

FIG. 4 is a block diagram of the encoder 105.

A selector 401 distributes the input image signals R, G and B.

RAM's 402, 403, 404 are buffer memories for respectively storing the R, G and B image signals for several main scanning lines, and are used for matching the rate of image data input to the encoder 105 and the output rate therefrom.

A color compression encoder 405 effects compression encoding of 3-bit R, G, B signals. In the present embodiment, a highly efficient compression is achieved for example by arithmetically predicted encoding.

An encoder 406 is composed, in the present embodiment, of an MMR encoder matching the G4 standard, with ability to communicate with existing facsimile apparatus. MH or MR encoding of a G3 protocol is also possible.

A selector 407 serves to select thus encoded video data, and transfers the encoded data, in the unit of a frame, to the rigid disk 111 through the encoded image bus 117 shown in FIG. 1.

A control unit 408 sets the modes for the color compression encoder 405, MMR encoder 406 and selector 407 according to the instruction from the CPU 113, whereupon each encoder effects operation in the encoding mode or in the non-compression (through) mode, according to the selected sheet size and resolving power.

The color compression encoder 405 of the present embodiment is also provided with a mode of compression encoding, utilizing either one of the R, G, B 3-bit signals.

Also, the color compression encoder 405 and the MMR encoder 406 are both capable of conversion of resolving power and of sheet size, according to the selected mode, in the following manner:

Conversion of resolving power:
1) 400×400→200×200 dpi
2) 200×200→400×400 dpi

Conversion of sheet size:
1) A4 to A3
2) B4 to B5
3) B5 to B4.

Figure 5:
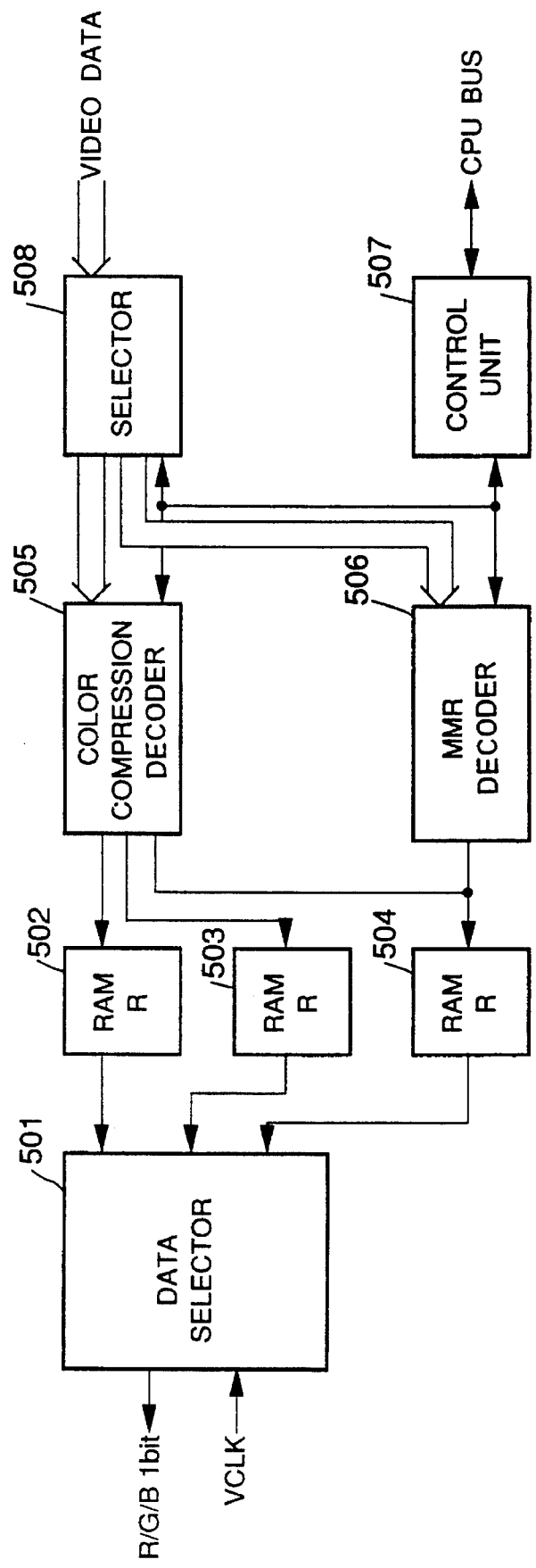
FIG. 5 is a detailed block diagram of the decoder unit shown in FIG. 1.

FIG. 5 is a detailed block diagram of the decoder 106.

A data selector 501 converts the decoded uncompressed image data into R, G and B 1-bit serial data.

RAM's 502, 503, 504 are buffer memories for storing decoded R, G and B uncompressed data for several main scanning lines, and are used for rate matching as in the RAM's 404–406 in FIG. 4.

A color compression decoder 505 is used for decoding the codes, encoded in the color compression encoder 405.

A decoder 506 is an MMR decoder matching the G4 standard, and which is capable of communication with the existing facsimile apparatus, and is also capable of MR or MH decoded according to the G3 standard.

A control unit 507 sets the mode for the color decoder 505 and the MMR decoder 506 according to an instruction from the CPU 113, and sets the operation for each size and resolving power, according to the encoding mode or the non-compression (through) mode.

A selector 508 enters the encoded data from the rigid disk 111 through the encoded image bus 117, effects buffering, and provides the encoders 505 and 506 with encoded data according to the encoding method of the data.

Figure 8:
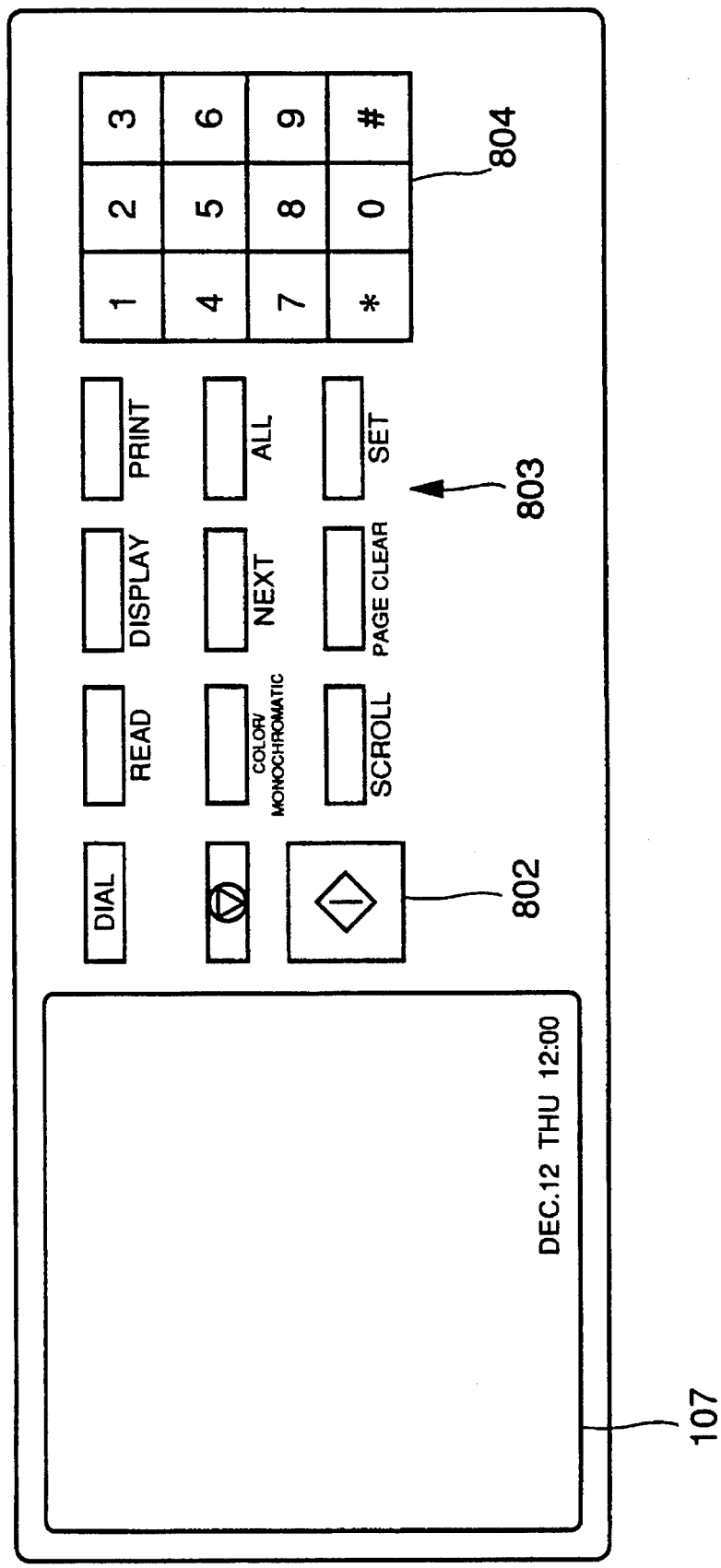
FIG. 8 is a plan view of an operation panel shown in FIG. 1.

FIG. 8 is an external plan view of the operation panel 114.

A display unit 107 is composed of a liquid crystal display (LCD), capable of displaying images and characters, receiving character display commands from the CPU 113 and which is controlled by an unrepresented internal CPU.

A key column 802 includes dialing start and stop keys. Key columns 803 includes keys relating to transmission, reception, display and print. Key columns 804 includes numeral keys. Actuation of these keys are identified by an unrepresented internal CPU, and the depression of each key provides a signal to the CPU 113.

Figure 12:
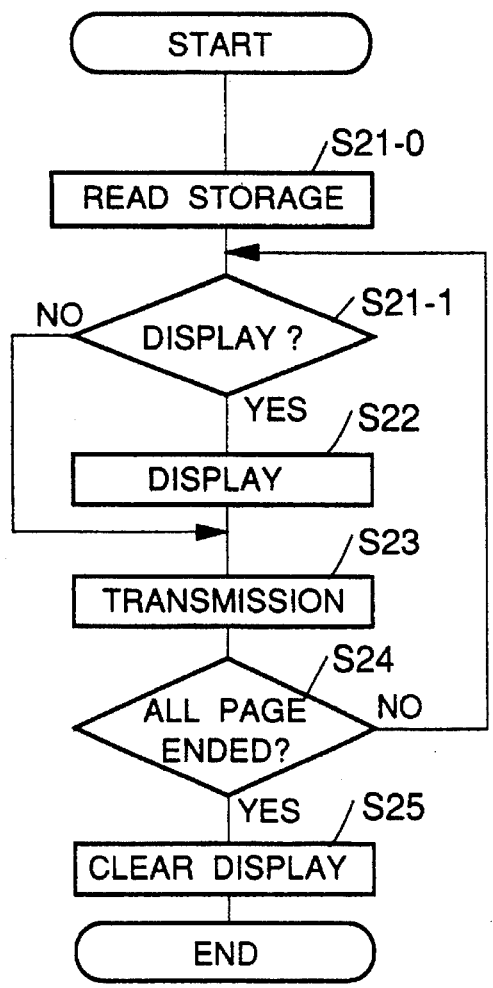
FIG. 12 is a flow chart showing the outline of original reading, display, transmission and display clearing at transmission time.

FIG. 12 is a flow chart showing the outline of original reading, display, transmission and display clear in the transmitting operation.

Figure 9:
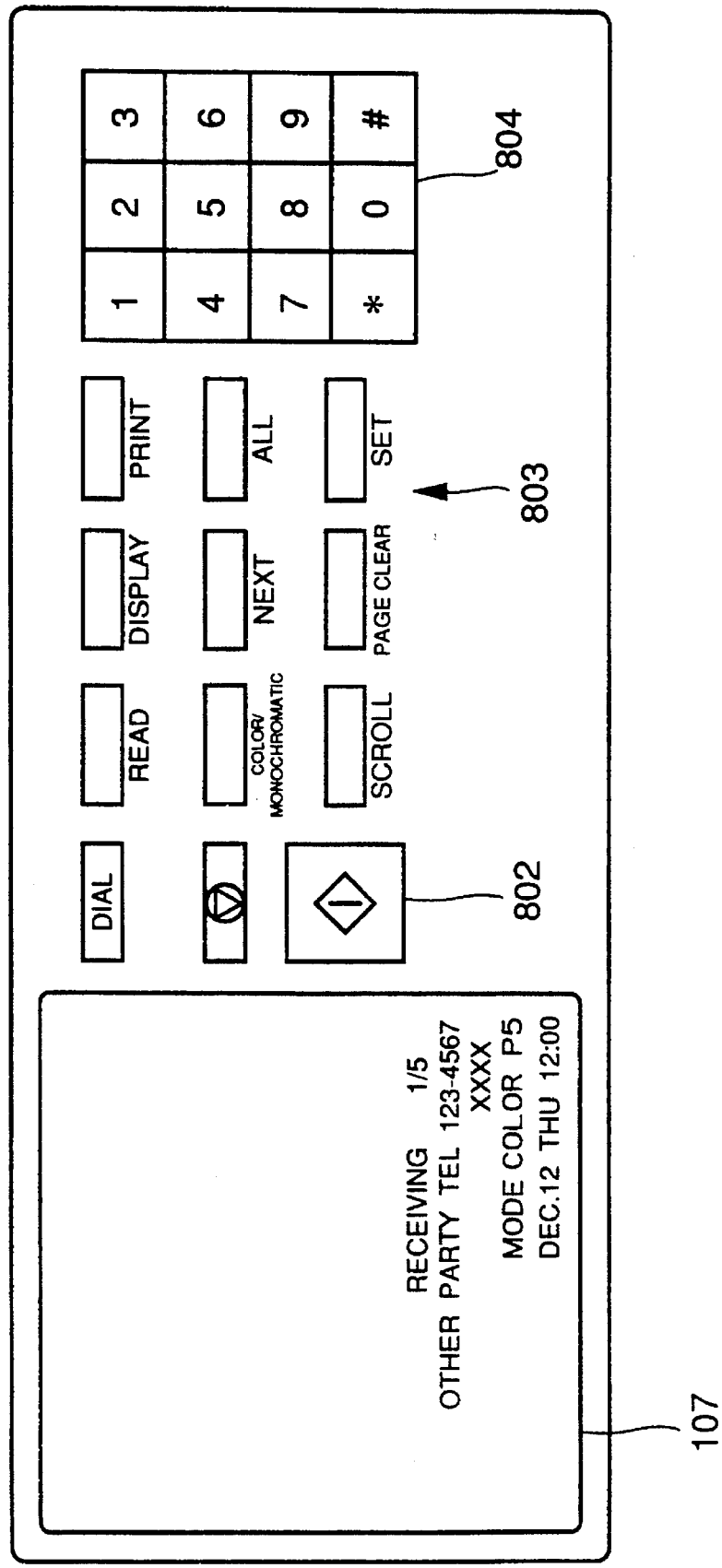
FIG. 9 is a plan view showing an example of display on the display unit shown in FIG. 1.

At first an original is read by the scanner 101, and the obtained signal is subjected to image processing and encoding. Then data representative of all the pages is stored in the rigid disk (S21-0). In case the display key shown in FIG. 9 is actuated by the operator, the sequence branches from a step S21-1 to S22 for displaying the first page on the display unit 107 (S22), and transmission is conducted by the CPU 112 (S23). These operations are repeated until all the pages of the original, read in the step S21, are transmitted (S24). On the other hand, if the display key is not actuated, the sequence branches from the step S21-1 to S23, and, when all the pages are transmitted, the display control unit 108 clears the image on the display unit 107 to black (S25).

Figure 13:
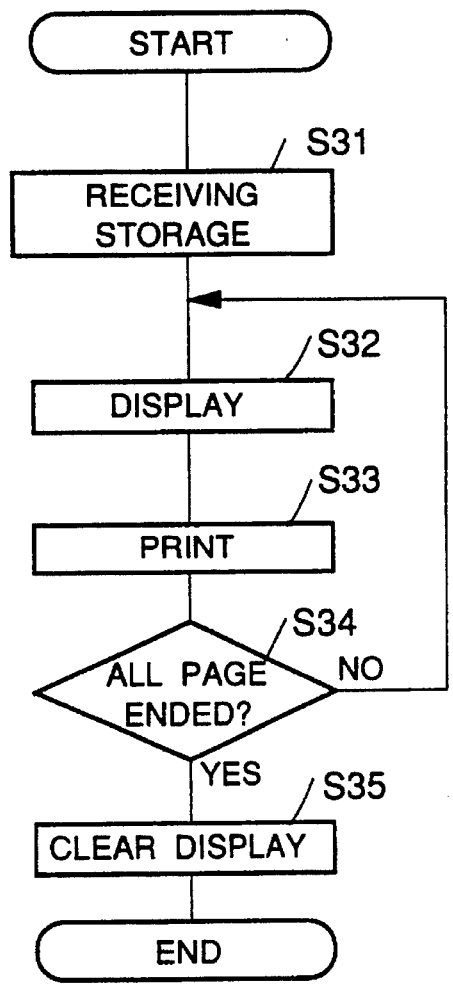
FIG. 13 is a flow chart showing the outline of reception, storage, display, printing and display clearing at reception time.

FIG. 13 is a flow chart showing the outline of received data storage, display, print and display clearing at the receiving operation.

At first, all the pages of images received by the CCU 112 are stored in the rigid disk 111 (S31), display (S32), and, if necessary, the image is printed by the printer 102 (S33). This operation is repeated until all the received pages are printed (S34). Thereafter the display control unit 108 clears the image of the display unit 107 to black (S35).

Figure 14:
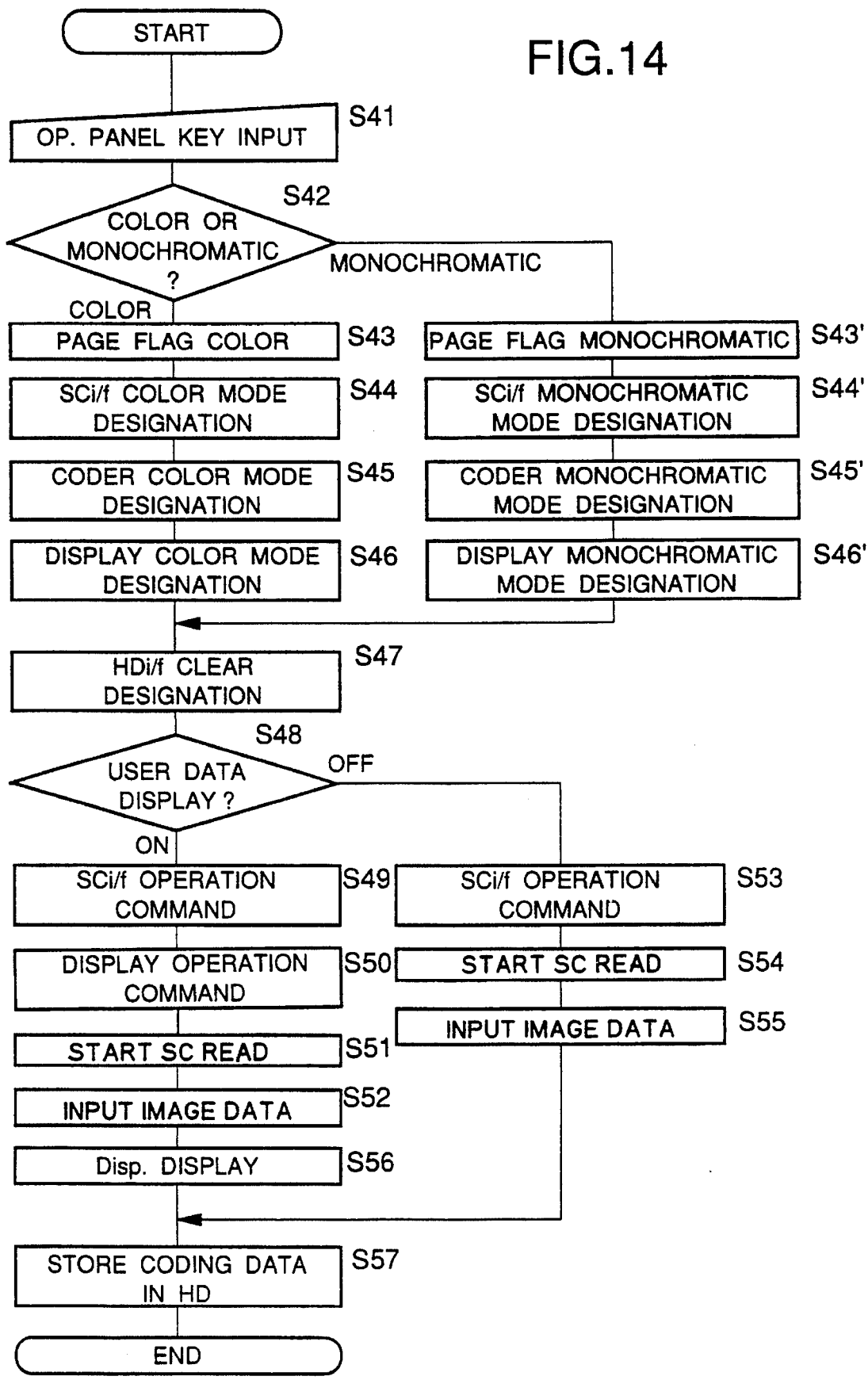
FIG. 14 is a flow chart showing the outline of original reading, encoded data storage and image display in the apparatus of FIG. 1.

FIG. 14 is a flow chart showing the outline of original reading, encoded data storage and image display.

At first, when the reading key on the operation panel 114 is depressed, the CPU 113 discriminates the state of a color/monochrome key, and sets a page flag according to the color mode or the black-and-white mode selected (S43, S43'). It then instructs the modes for the scanner interface 103, encoder 105 and display control unit 118 (S44–S46', S44'–S46'), and provides an instruction to the rigid disk interface 110 for securing a storage area in the rigid disk 111 (S47).

Then a user data area (not shown) in the CPU 113 is referred to, and the subsequent operations are switched according to a flag indicating the state of display for the read image (S48). In case the display is on, start commands are given to the scanner interface 101 and the display control unit 108, whereby the scanner 101 starts reading operation and the display unit 107 displays the read data (S49–S52, S56). In case the display is off, a start command is given to the scanner interface 101 to start the image reading operation thereof, whereby the read data are entered (S53–S55).

The read data are encoded by the encoder 106, and stored in the unit of a page in the rigid disk 111 through the rigid disk interface 110. At the same time, according to the setting of the color/monochrome key, a color flag or a monochrome flag is stored in the rigid disk, together with the encoded data. The encoder 105 effects encoding with the mode designated in the step S45 (S57).

FIG. 15 is a flow chart showing the operation of displaying the image, stored in the rigid disk 111, on the display unit 107, and transmitting the image.

When the display key on the operation panel 114 is actuated (S61), the CPU 113 sets parameters in the image conversion unit 303, shown in FIG. 3, according to the page flag, indicating whether the image in the rigid disk 111 is a color or monochrome image, and effects image display by calling an "image display" subroutine to be explained later (S62–S65).

Then, in case the "Next" key on the operation panel 114 is actuated (S66), the CPU 113 refers to a page flag, indicating whether a next image is stored, and a page address, indicating the storage address of the next image (S67), and the sequence returns to the step S62 to display the next page.

FIG. 16 is a flow chart showing the operations of transmission and display.

When an original image is stored in the rigid disk 111 and the operator actuates the dialing key and the numeral keys to enter a number, the CPU 113 sends an area designation for the rigid disk 111 to the rigid disk interface 110, prepares for the image data readout, and sends a communication preparation command to the CCU 112 (S71, S72). The CCU 112 starts communication with the destination and receives the functions of the destination (S73).

The CPU 113 compares the image processable by the functions of the destination with the already stored image (S74), and, if the kinds of both images are different, instructs conversion modes to the encoder 105 and the decoder 106 for effecting image conversion and instructs the rigid disk interface 110 to read the image data from an area of the rigid disk 111 in which the image to be converted is stored (S75–S77, S81). Then it sends commands for these operations (S82, S83).

Then the decoder 106 generates an uncompressed image, and the encoder 105 effects encoding with image conversion, and the converted image is again stored in the rigid disk 111 (S84–S85).

In case the step S78 identifies that the operator has selected the display, the CPU 113 instructs the display mode to the display control unit 108 and designates an area to the page memory 109, thereby displaying the image in conversion on the display unit 107 (S79–S80).

Then, at the start of transmission, there is discriminated, from the state of the display flag, whether the display key shown in FIG. 9 has been actuated (S87), and, if the display mode is selected, the display mode is designated to the decoder 106 and the display control unit 108 (S88, S89). Also an area designation is given the page memory 109 as a preparation for display (S90).

Then the CCU 112 sends a notice of start of image transmission to the destination (S91).

The CPU 113 sends an operation command to the decoder 106 in response to the display flag (S93), sends an operation command to the rigid disk interface 110 (S94), thereby transferring the stored image from the rigid disk 111 to the CCU 112, and causes the CCU 112 to transmit the image (S95, S96). If the display flag is turned on by the operator, the image is displayed on the display unit 107 (S97, S98).

Then a discrimination is made as to whether all the pages of the images stored in the rigid disk 111 have been transmitted (S99), and the sequence from the step S87 is repeated until the transmission is completed. When all the pages have been transmitted, the CCU 112 sends a notice of end of transmission to the destination (S100), and the transmitting operation is terminated.

FIG. 17 is a flow chart showing the operations of reception and received image display.

At first, when a call is received from the communication channel 115, the CCU 112 sends a notice for call reception to the CPU 113 (S101).

The CPU 113 instructs the rigid disk interface 110 to secure an area in the rigid disk 111 for storing the received data (S102), then refers to the display flag (S103), and, if the display is on, sends an operation command to the decoder 106 (S104–S107). It then transfers the image received by the CCU 112 to the decoder 106 (S108) and also stores the received encoded image in the reception area of the rigid disk 111 (S109). The decoder 106 stores the uncompressed image in the page memory 114, thereby displaying the image on the display unit 107 (S120).

If step S103 identifies that the display is off, the image received by the CCU 112 is transferred to the rigid disk interface 110 and stored in the rigid disk 111 (S121, S122).

Then there is discriminated whether a reception end notice has been received (S123), and the sequence starting from the step S102 is repeated until the notice is received.

When the reception is terminated, the identification number of destination, number of pages, communication mode and total number of receptions, received from the destination, are stored in a reception data area in the rigid disk 111 (S124, S125), and the receiving operation is terminated.

Figure 18B:
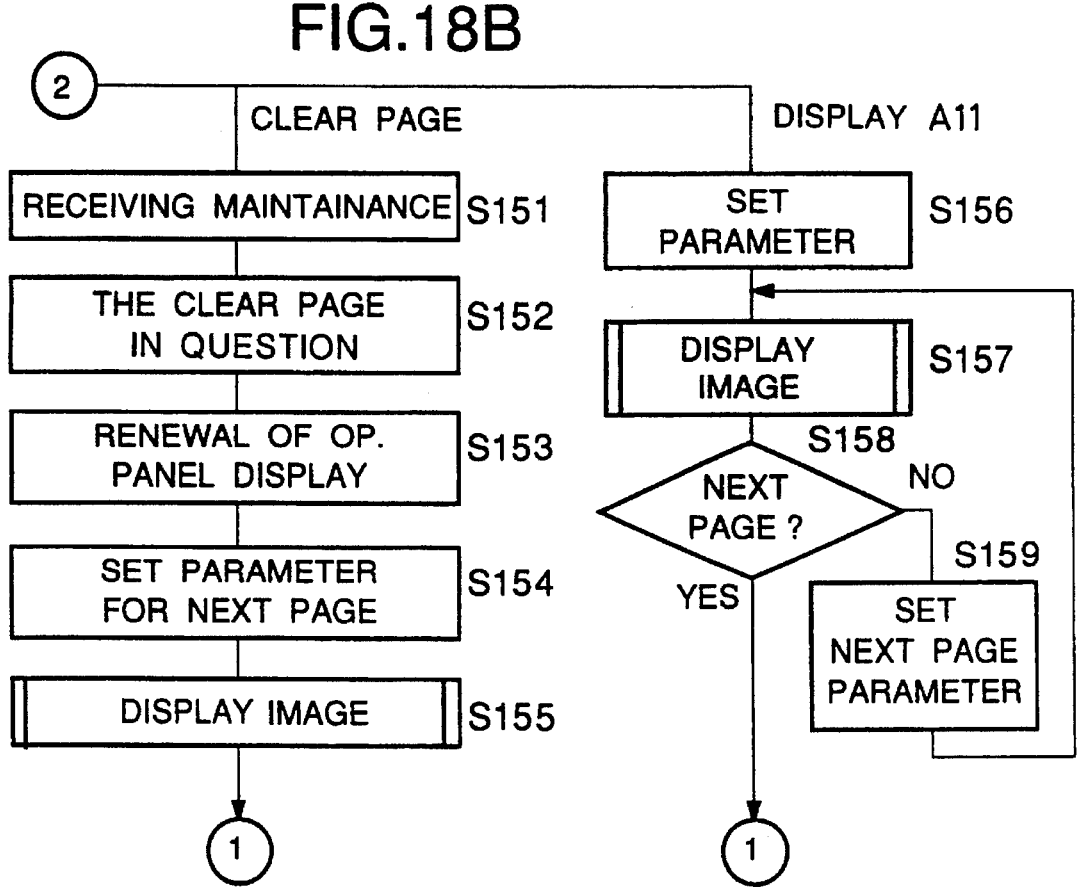

FIG. 18 is a flow chart showing operations after the reception, including panel displays at or after the reception, image display, print out etc.

At the end of a receiving operation, the CPU 113 obtains the number of received communications from a total reception counter in a reception control table (S131), and sends a display command to the control unit 305 in FIG. 3 and the operation panel 114, in order to display characters corresponding to the data (S132). Also the CPU 113 reads, from the received data area of the rigid disk 111, the identification number of the destination, abbreviation thereof, number of pages and communication mode of the most recently received communication (S133), and sends a display command to the operation panel 114 and the control unit 305 in order to display these data in characters (S134), whereupon the operation panel 114 displays the information (S135). The display unit 107 in FIG. 9 illustrates an example of such display.

Then respective operations are conducted in response to key actuations on the operation panel 114 (S136).

In case the display key and the "Next" key are actuated, the CPU 113 received, from the received data area, the number of the destination, abbreviation thereof, number of pages, communication mode etc. of a reception immediately preceding the one displayed before, and sends these data to the display control unit 108 for display on the operation panel 114 (S137–S139).

In case the display key and the set key are actuated, in order to display an image of which data are displayed on the operation panel 114 as shown by 107 in FIG. 9, the CPU 113 sets the parameters such as the received image area of the rigid disk and the image mode (S140), and calls the "image display" subroutine (S141), thereby displaying the image on the display unit 107.

Then, in response to the actuation of the "set" key of the operation panel 114, the sequence repeats steps S136 to S140 for displaying the next page.

In case the print key and the "next" key are actuated, in order to print a page corresponding to the reception displayed on the operation panel 114, the CPU 113 sets mode parameters for the image area of the rigid disk 111, the decoder 106 and the printer interface 104 (S142), then discriminates whether the page memory 109 contains an uncompressed image the same as that to be printed (S143), and, if the image is present, calls the "print page memory" subroutine (S144). If the uncompressed image is absent, the CPU 113 calls the "print" subroutine to be explained later, in order to obtain data from the rigid disk 111 (S145).

In this manner the print out in the unit of a page is conducted.

In case the print key and the "all" key are actuated, in order to print all the pages of the image corresponding to the data displayed on the operation panel 114, the CPU 113 sets mode parameters for the image area of the rigid disk 111, the decoder 106 and the printer interface 104, the CPU 113 calls the "print" subroutine (S146, S147), and the operations are repeated until all the pages of the reception are printed (S148).

In case the "page clear" key is actuated, in order to clear the page corresponding to the data displayed on the operation panel 114, the CPU 113 deletes the page from the reception control table (S151, S152), then steps up the displayed page number, and sends the revised page number to the display control unit 305 for renewing the page display on the operation panel 114 (S153).

Then, in order to display the image of the next page on the display unit 107, the CPU 113 sets the mode parameters for the image area of the rigid disk 111, the decoder 106 and the display control unit 108, and calls the "image display" subroutine (S154, S155).

In case the display key and the "all" key are actuated, in order to display the image corresponding to the data displayed on the operation panel 114, the CPU 113 sets mode parameters for the area of the rigid disk 111, the image mode etc. (S156), and calls the "image display" subroutine (S157).

Then a discrimination is made as to whether the display of all the pages of the received data has been completed (S158), then, if not, parameters for the next page are set (S159) and the sequence returns to the step S157. Such display of all the pages may be conducted by renewing the page display at a predetermined interval, or by renewing the display at each manual instruction.

Figure 19:
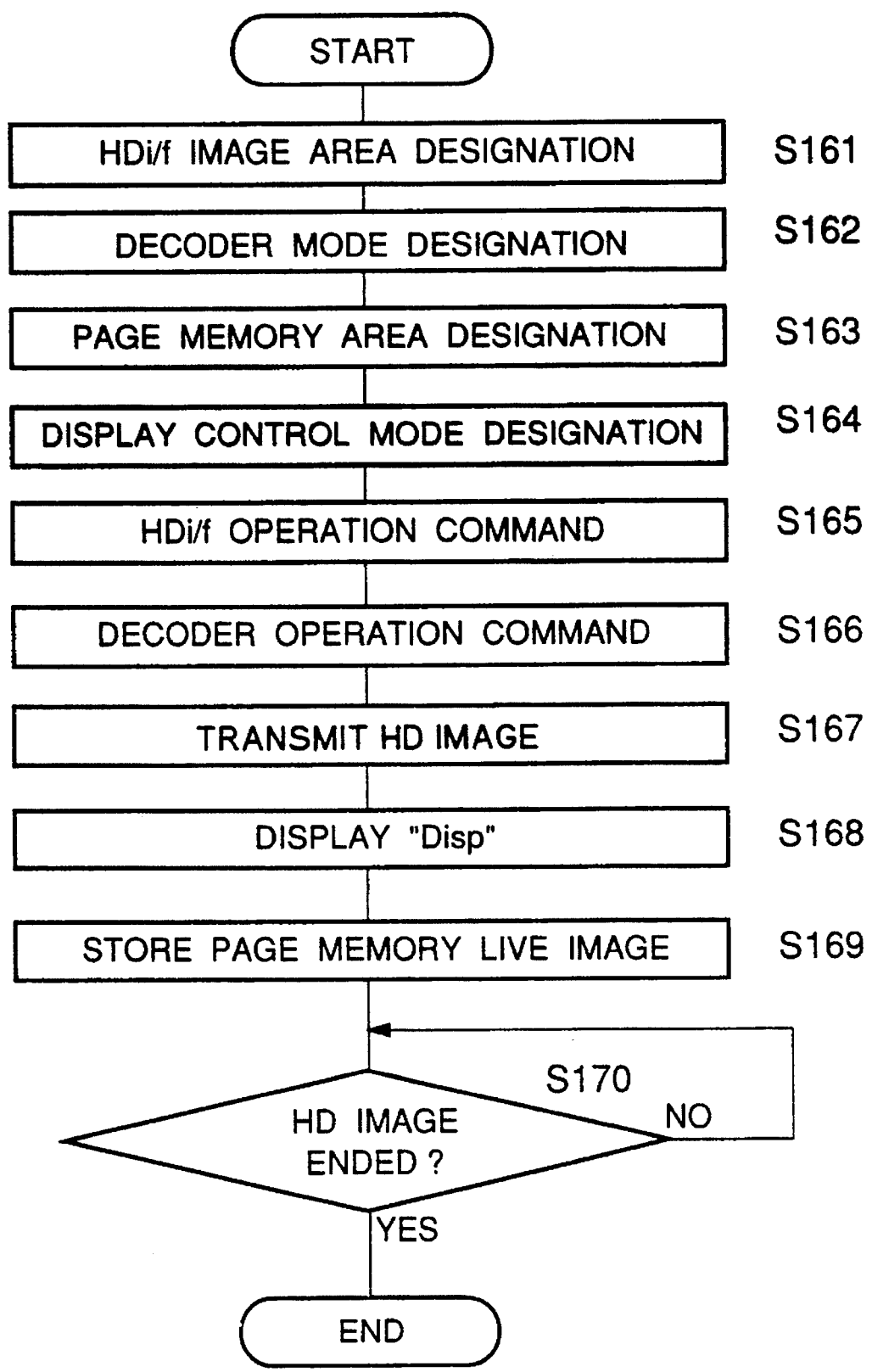
FIG. 19 is a flow chart of an "image display" subroutine.

FIG. 19 is a flow chart of the "image display" subroutine to be called in the foregoing flow charts.

When this subroutine is called, the image area of the rigid disk interface 110, and the operation modes of the decoder 106 and of the display control unit 108 are set by parameters, and the functions of various units are determined by the parameters.

At first, mode instructions are given to the rigid disk interface 110, the decoder 106, the page memory 109 and the display control unit 108 (S161–S164), and operation commands are sent to the rigid disk interface 110 and the decoder 106 (S165–S166).

Then the image is transferred from the designated area of the rigid disk 111 to the decoder 106, and the uncompressed image, obtained by decoding in the decoder 106 according to a predetermined mode, is supplied from the display control unit 108 to the display unit 107 for display therein (S167, S168). The uncompressed image is also stored in the page memory 114. The CPU 113 terminates the sequence when a page is processed (S169, S170).

Figure 20:
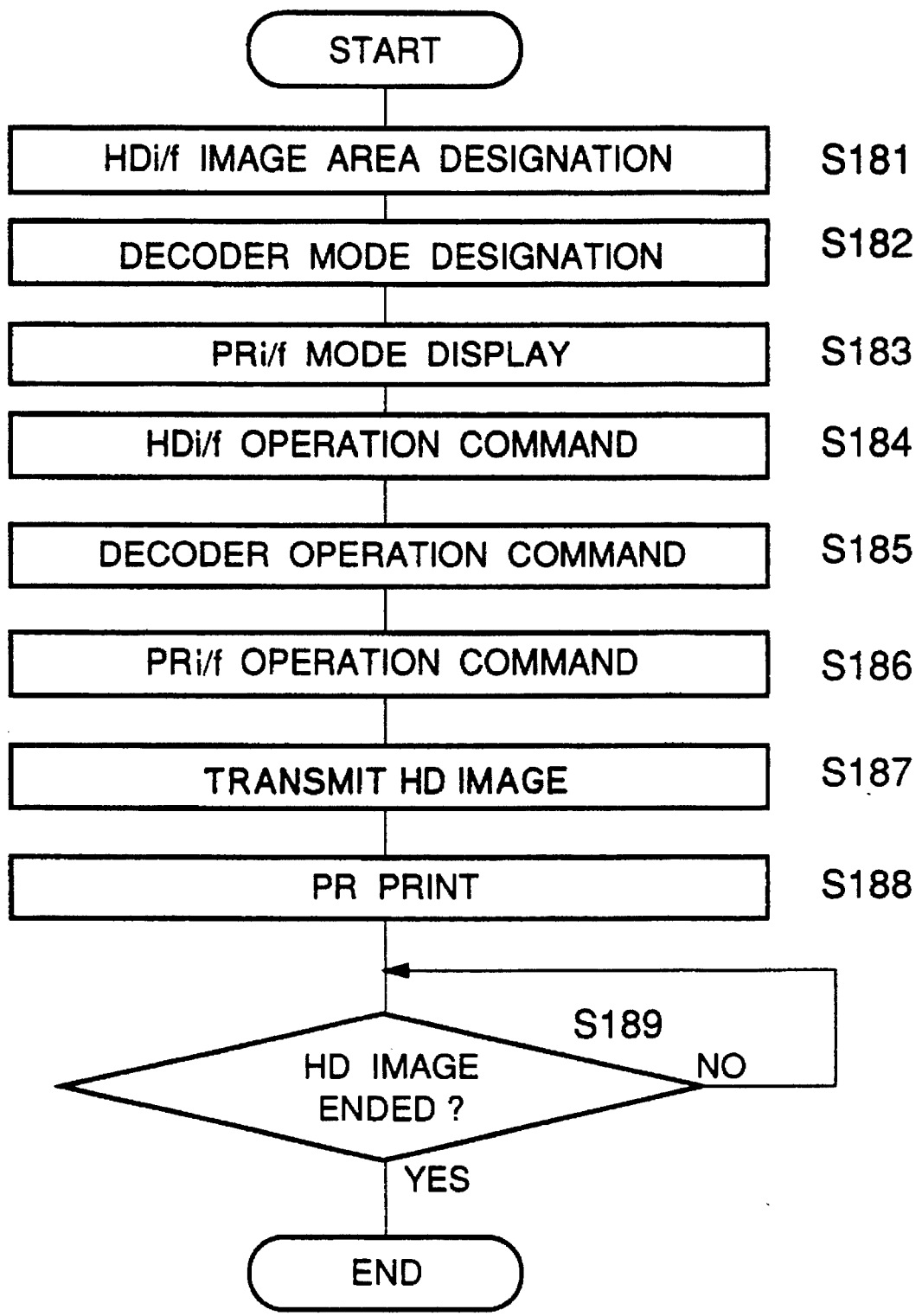
FIG. 20 is a flow chart of a "print" subroutine.

FIG. 20 is a flow chart of the "print" subroutine to be called in the foregoing flow charts. When it is called, the instruction of image area in the rigid disk 111 to the rigid disk interface 110, the operation mode of the decoder 106 and the instruction of operation mode of the printer 102 to the printer interface 104 are set by parameters, and the various units function according to the parameters.

At first according to the set parameters, mode instructions are provided to the rigid disk interface 110, decoder 106 and printer interface 104 (S181–S183). Then operation commands are sent to the rigid disk interface 110, decoder 106 and printer interface 104 (S184–S186). Thus the image is transferred from the rigid disk 111 to the decoder 106, then decoded therein according to a predetermined mode, and the obtained uncompressed image is supplied via the printer interface 104 to the printer 102 for image print out.

The CPU 113 terminates the sequence after completion of a page (S187–S189).

Figure 21:
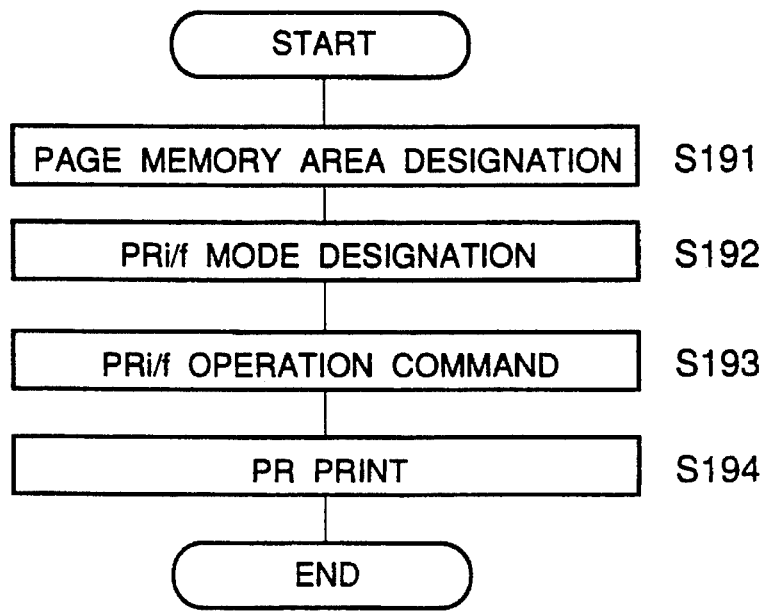
FIG. 21 is a flow chart of a "print page memory" subroutine.

FIG. 21 is a flow chart of the "print page memory" subroutine to be called in the foregoing flow charts. When it is called, a parameter is set in the printer interface 104 for designating the operation mode of the printer 102, and the printer 102 functions according to the parameter.

At first an area designation and a reading mode are set in the page memory 109 (S191), then a mode parameter is sent to the printer interface (S192), and an operation command is sent to the printer interface 104, whereupon the uncompressed image data are supplied from the page memory 109 through the printer interface 104 to the printer 102 to obtain the image of a page (S193, S194).

In the above-explained embodiment, in case of transmitting a monochromatic image, the luminance signal Y generated from the R, G, B signals in the color/monochrome conversion unit 202 is used as the monochromatic signal, but it is also possible to select one of the R, G and B signals as the monochromatic signal. Such method allows to dispense with the color/monochrome conversion unit 202, thereby simplifying the structure of the scanner interface. In such structure, the obtained monochromatic image may be inappropriate in the case of transmitting a color image in the monochromatic state, but, in such a case it is also possible to visually inspect the obtained monochromatic image on display, and, if it is considered inappropriate, to prepare a corrected monochromatic image for resending.

Also, the rigid disk for image storage may be replaced by a semiconductor memory such as a DRAM, or by a magneto-optical disk.

It is also possible to dispense with the page memory 109 for storing the uncompressed image, and to effect all the image transfers from the image memory (rigid disk).

It is furthermore possible, at the original image reading, to transmit the read image directly from the CCU, without storage in the image memory, or, also at the original image reading, to store the image in the image memory in a state of a binary uncompressed image.

As explained in the foregoing, the present embodiment enables to display the image on the display unit at the time of image transmission, and, in case of transmission of a monochromatic image, to select certain component as a monochromatic signal from the color image signal obtained from the scanner, thereby providing advantages of dispensing with the conversion from the color image to the black-and-white image and thus simplifying the circuit structure.

What is claimed is:

1. An image transmitting apparatus for transmitting a color image or a monochromatic image comprising:

a transmission memory for storing color image data transmitted;

transmission means for transmitting the color image data stored in said transmission memory in a color transmission mode or in a monochromatic transmission mode;

a display memory separated from said transmission memory for storing color image data corresponding to the color image data stored in said transmission memory;

a monitor for visually displaying the color image data stored in said display memory, as a color image or a monochrome image, before said transmission means transmits the correspondent image data stored in said transmission memory to a network; and process means for processing image data to be stored in said display memory according to the transmission mode of said transmission means.

2. An apparatus according to claim 1, further comprising:

a conversion means for converting an original color image into the color image data.

3. An apparatus according to claim 2, wherein said conversion means is a color scanner.

4. An apparatus according to claim 1, wherein said process means processes the image data to be stored in said display memory so as to display the monochromatic image in said monitor in the monochromatic transmission mode.

5. An apparatus according to claim 1, wherein said process means stores into said display memory only a predetermined color component included in the color image data, in the monochromatic transmission mode.

6. An apparatus according to claim 1, wherein said transmission means includes coding means for coding the color image data by a coding method corresponding to the transmission mode.

7. A color facsimile apparatus for transmitting a color image or a monochromatic image, comprising:

a color scanner for converting an original into color image data;

a transmission memory for storing the color image data;

transmission means for transmitting color image data stored in said transmission memory in a color transmission mode or in a monochromatic transmission mode; and conversion means for converting the color image data into processed color image data or processed monochrome image data according to the transmission mode of said transmission means, to output the processed color or monochrome image data to a display memory disposed in a monitor for displaying visually before said transmission means transmits the correspondent image data stored in said transmission memory to a network.

8. An apparatus according to claim 7, wherein said conversion means converts the color image data such that the monitor displays the monochromatic image in the monochromatic transmission mode.

9. An apparatus according to claim 7, wherein said conversion means outputs only a predetermined color component included in the color image data as the processed monochrome image data in the monochromatic transmission mode.

10. An apparatus according to claim 7, wherein said transmission means includes coding means for coding the color image data by a coding method corresponding to the transmission mode.

11. A color facsimile apparatus for transmitting a color image or a monochromatic image comprising:

a color scanner for converting an original into color image data;

a transmission memory for storing the color image data to be transmitted; and supplying means for processing the color image data and supplying it to a display memory disposed in a monitor before the color image data stored in said transmission memory is transmitted to a network, wherein said supplying means has a first mode for displaying the color image data on the monitor as a monochromatic image, and a second mode for displaying it as a color image.

12. An apparatus according to claim 11, further comprising:

a generation means for generating a character data.

13. An apparatus according to claim 12, further comprising:

a conversion means for converting the character data generated from said generation means into the image data.

14. An apparatus according to claim 11, further comprising:

a transmission means for transmitting a given color image data in a color transmission mode or in a monochromatic transmission mode.

15. An apparatus according to claim 14, wherein said supplying means selects either one of the first and second mode according to a transmission mode of said transmission means.

16. An apparatus according to claim 14, wherein said transmission means includes coding means for coding the color image data by a coding method corresponding to the transmission mode.

17. An apparatus according to claim 16, wherein said coding means includes MMR coding.

18. An apparatus according to claim 11, wherein said supplying means supplies only a specified color component included in the color image data in the first mode.

19. An image transmitting apparatus for transmitting a color image or a monochromatic image, comprising:

a transmission memory capable of storing color image data to be transmitted;

transmission means for transmitting the color image data stored in said transmission memory in a color transmission mode or in a monochromatic transmission mode;

a display memory separated from said transmission memory capable of storing color image data corresponding to the color image data stored in said transmission memory; and processing means for processing the color image data to be stored in said display memory according to the transmission mode of said transmission means to produce image data representing a color image or a monochromatic image.

20. An image transmitting apparatus for transmitting a color image or monochromatic image, comprising:

input means for inputting multi-valued color image data;

conversion means for converting the multi-valued color image data into binary image data;

a transmission memory capable of storing the binary color image data to be transmitted;

transmission means for transmitting the binary color image data stored in said transmission memory in a color transmission mode or a monochromatic transmission mode;

a monitor for displaying the color image corresponding to the input color image data; and processing means for processing the color image data to be supplied to said monitor according to the transmission mode of said transmission means to produce image data representing a color image or a monochromatic image.

21. A color facsimile apparatus for transmitting a color image or monochromatic image, comprising:

a color scanner for converting an original into multi-valued color image data;

conversion means for converting the multi-valued color image data into binary image data;

transmission means for transmitting the binary color image data converted by said conversion means in a color transmission mode or a monochromatic transmission mode; and processing means for processing the binary color image data to be supplied to a monitor for displaying the color or monochromatic image according to the transmission mode of said transmission means to produce image data representing a color image or a monochromatic image.

22. A color facsimile apparatus for transmitting a color image or monochromatic image, comprising:

a color scanner for converting an original into multi-valued color image data;

conversion means for converting the multi-valued color image data into binary image data;

a transmission memory capable of storing the binary color image data to be transmitted; and processing means for processing the binary color image data to be supplied to a monitor for displaying the color or monochromatic image according to the transmission mode of said transmission means to produce image data representing a color image or a monochromatic image.

* * * * *

UNITED STATES PATENT AND TRADEMARK OFFICE
CERTIFICATE OF CORRECTION

PATENT NO. : 5,485,283

DATED : January 16, 1996

INVENTOR(S): Yoji Kaneko

Page 1 of 2

It is certified that error appears in the above-identified patent and that said Letters Patent is hereby corrected as shown below:

In the Drawings:

FIGURE 17

Sheet 17 of 21, "DECORDE" should read --DECODER--.

FIGURE 18B

Sheet 19 of 21, "MAINTAINANCE" should read --MAINTENANCE--.

COLUMN 2

Line 16, "in said" should be deleted.

COLUMN 3

Line 3, "following" should read --following,--.
Line 34, "composed" should read --composed of--.

COLUMN 4

Line 26, "generate" should read --generates--.
Line 33, "a" should read --an--.

UNITED STATES PATENT AND TRADEMARK OFFICE
CERTIFICATE OF CORRECTION

PATENT NO. : 5,485,283

DATED : January 16, 1996

INVENTOR(S) : Yoji Kaneko

It is certified that error appears in the above-identified patent and that said Letters Patent is hereby corrected as shown below:

COLUMN 5

Line 65, "On" should read --On the--.
Line 65, "if the" should read --if--.

COLUMN 7

Line 59, "(S44-S46'," should read --(S44-S46,--.

Signed and Sealed this

Second Day of July, 1996

Attest:

BRUCE LEHMAN

Attesting Officer    Commissioner of Patents and Trademarks